United States Patent
Saze

(10) Patent No.: US 7,340,571 B2
(45) Date of Patent: Mar. 4, 2008

(54) STORAGE SYSTEM AND DATA MANAGEMENT DEVICE FOR STORAGE SYSTEM

(75) Inventor: Nobuyuki Saze, Odawara (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 10/975,449

(22) Filed: Oct. 29, 2004

(65) Prior Publication Data
US 2006/0053250 A1    Mar. 9, 2006

(30) Foreign Application Priority Data
Sep. 3, 2004   (JP)   ............... 2004-256536

(51) Int. Cl.
*G06F 12/16* (2006.01)
(52) U.S. Cl. ..................... 711/154; 711/100
(58) Field of Classification Search ................ 711/100, 711/154, 162, 165, 170, 115, 148; 707/10, 707/204
See application file for complete search history.

(56) References Cited

U.S. PATENT DOCUMENTS

| | | | |
|---|---|---|---|
| 6,397,308 B1 * | 5/2002 | Ofek et al. ................. | 711/162 |
| 6,895,483 B2 * | 5/2005 | Eguchi et al. .............. | 711/165 |
| 6,950,915 B2 * | 9/2005 | Ohno et al. ................. | 711/162 |
| 2004/0024977 A1 * | 2/2004 | Delaney et al. ............. | 711/154 |
| 2005/0097260 A1 * | 5/2005 | McGovern et al. .......... | 711/100 |
| 2005/0114410 A1 * | 5/2005 | Fujibayashi ................. | 707/204 |
| 2005/0125411 A1 * | 6/2005 | Kilian et al. ................. | 707/10 |

FOREIGN PATENT DOCUMENTS

JP    2004-046435    2/2004

OTHER PUBLICATIONS

IBM Technical Disclosure Bulletin, Media Analysis For IBM AS/400 Computer, NN9310565, Oct. 1993.*

* cited by examiner

*Primary Examiner*—Pierre-Michel Bataille
*Assistant Examiner*—Paul Schlie
(74) *Attorney, Agent, or Firm*—Antonelli, Terry, Stout & Kraus, LLP.

(57) ABSTRACT

In the present invention, archive volumes are created in accordance with the size of data that is to be archived, and hence the storage regions are used in an efficient manner. The archive server acquires the data to be archived, via the application server, and detects the size of that data. The archive server issues an instruction to the storage device to cause the the storage device to generate an archive volume having a volume size corresponding to the data size of the data to be archived. The archive server writes the data to be archived to the volume having a storage capacity of the required size, and an access restriction and retention term are respectively established for the volume.

20 Claims, 18 Drawing Sheets

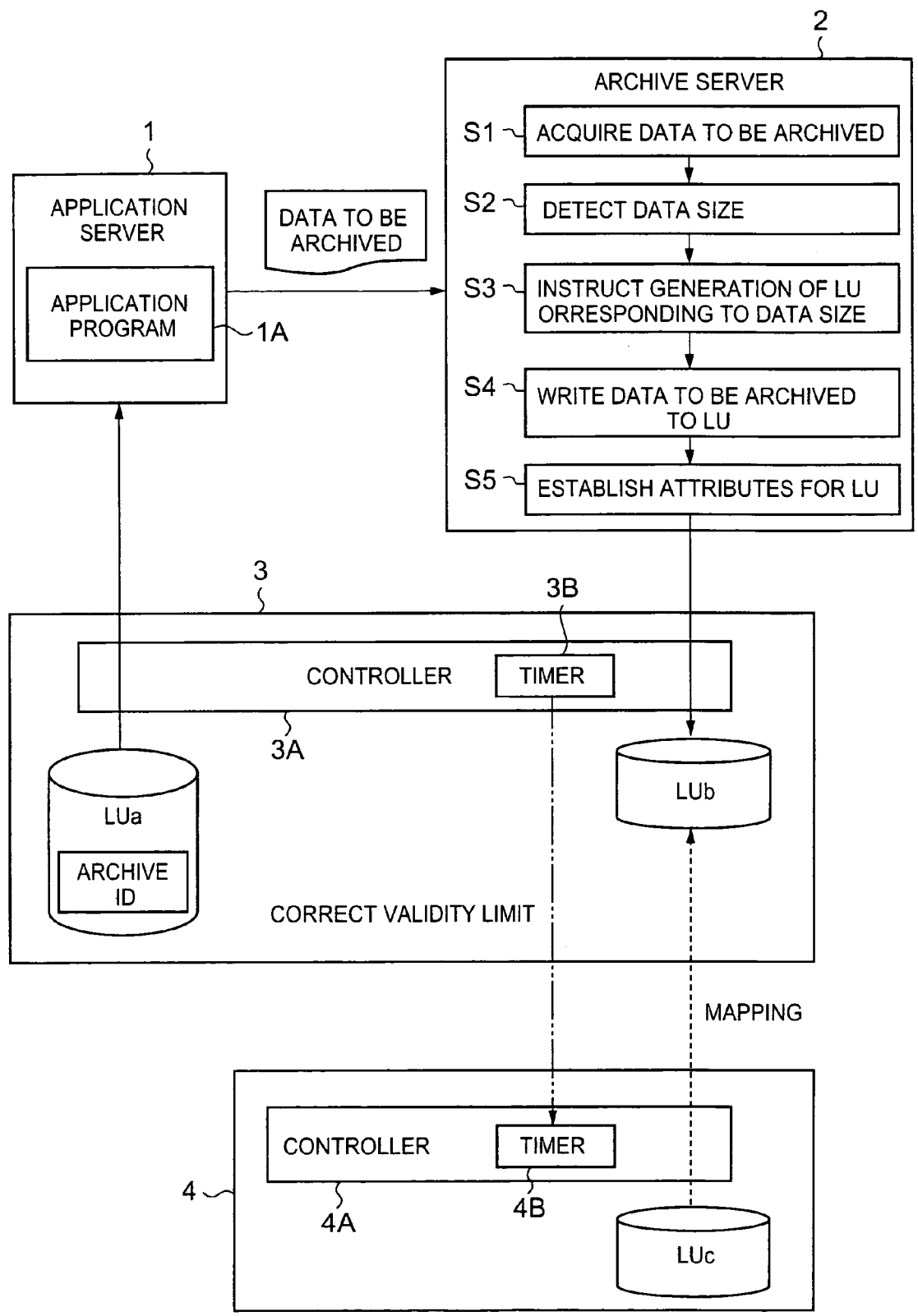

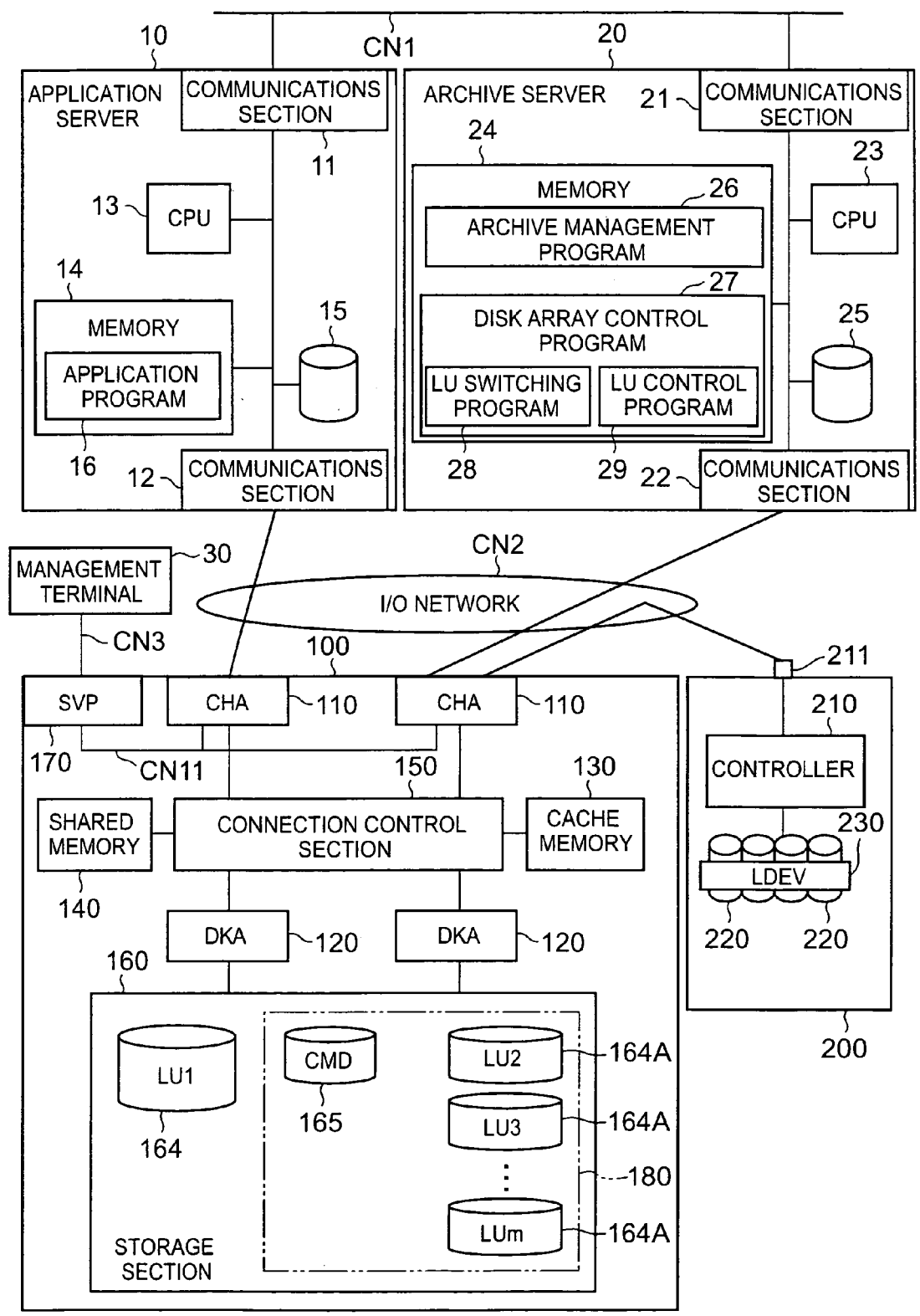

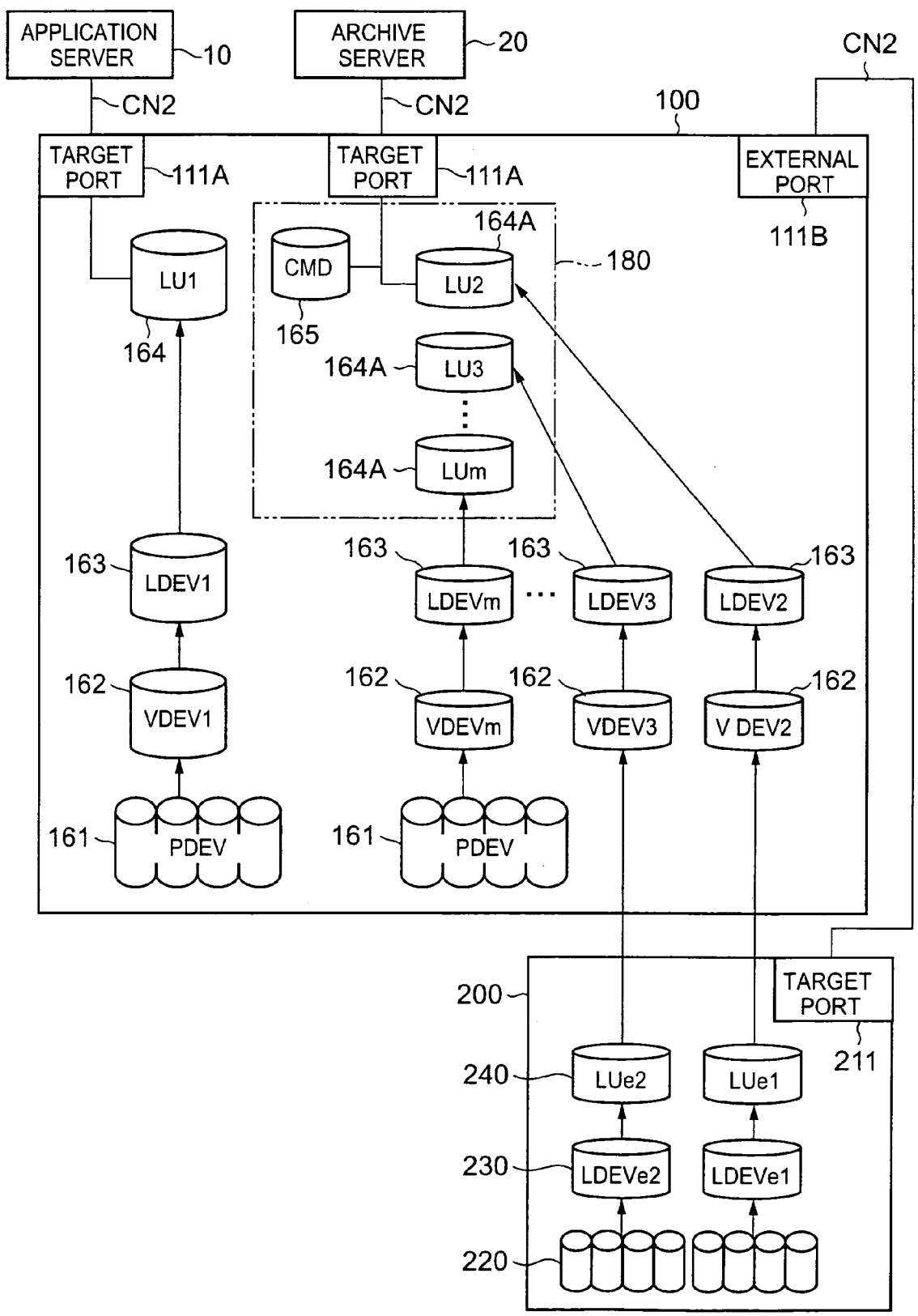

FIG. 5

MAPPING TABLE T1

| LUN NO. | LDEV | | VDEV | | | |
|---|---|---|---|---|---|---|
| | NO. | MAX. NO. OF SLOTS | NO. | MAX. NO. OF SLOTS | DEVICE TYPE | PATH INFORMATION |
| 1 | 1 | 10000 | 1 | 50000 | FC_Disk | INTERNAL PATH INFORMATION |
| 2 | 2 | 40000 | | | | |
| 3 | 3 | 50000 | 2 | 50000 | SATA_Disk | WWN,LUN |
| 4 | 4 | 50000 | 3 | 50000 | SATA_Disk | WWN,LUN |

FIG. 6

EMPTY CAPACITY MANAGEMENT TABLE (T2)

| RAID GROUP NO. | TOTAL CAPACITY IN RAID GROUP | EMPTY CAPACITY | STORAGE CATEGORY |
|---|---|---|---|
| 0 | 2000GB | 1980GB | INTERNAL SATA |
| 1 | 3000GB | 2987GB | INTERNAL FC |
| 2 | 4000GB | 3980GB | EXTERNAL SATA |
| ... | ... | ... | ... |

FIG. 7

LU MANAGEMENT TABLE (T3)

| RAID GROUP NO. | LU NO. | CAPACITY | LU ATTRIBUTE | RETENTION TERM | ARCHIVE DATE | DAY MOUNT TIME | CUMULATIVE MOUNT TIME |
|---|---|---|---|---|---|---|---|
| 0 | 00 | 5GB | READ ONLY | 365 DAYS | 2004/5/10 | 3 HOURS | 7 HOURS |
| 0 | 01 | 7GB | READ ONLY | 200 DAYS | 2004/5/22 | 1 HOUR | 5 HOURS |
| 0 | 02 | 8GB | READ ONLY | 200 DAYS | 2004/5/23 | 0 HOUR | 10 HOURS |
| 1 | 10 | 3GB | READ ONLY | 500 DAYS | 2004/8/10 | 0 HOUR | 3 HOURS |
| 1 | 11 | 10GB | READ ONLY | 0 DAY | — | 0 HOUR | 4 HOURS |
| 2 | 20 | 20GB | READ/WRITE | 0 DAY | — | 1 HOUR | 1 HOUR |
| ... | ... | ... | ... | ... | ... | ... | ... |

FIG. 8

ARCHIVE MANAGEMENT PARAMETER FILE

JUKE BOX NAME = abcd

COMMAND DEVICE NUMBER = CMD # * * *

ARCHIVE LU NUMBER = 0

ARCHIVE LU NUMBER = 1

ARCHIVE LU NUMBER = 2

ARCHIVE LU NUMBER = 3

RETENTION TERM = 365

FIG. 15
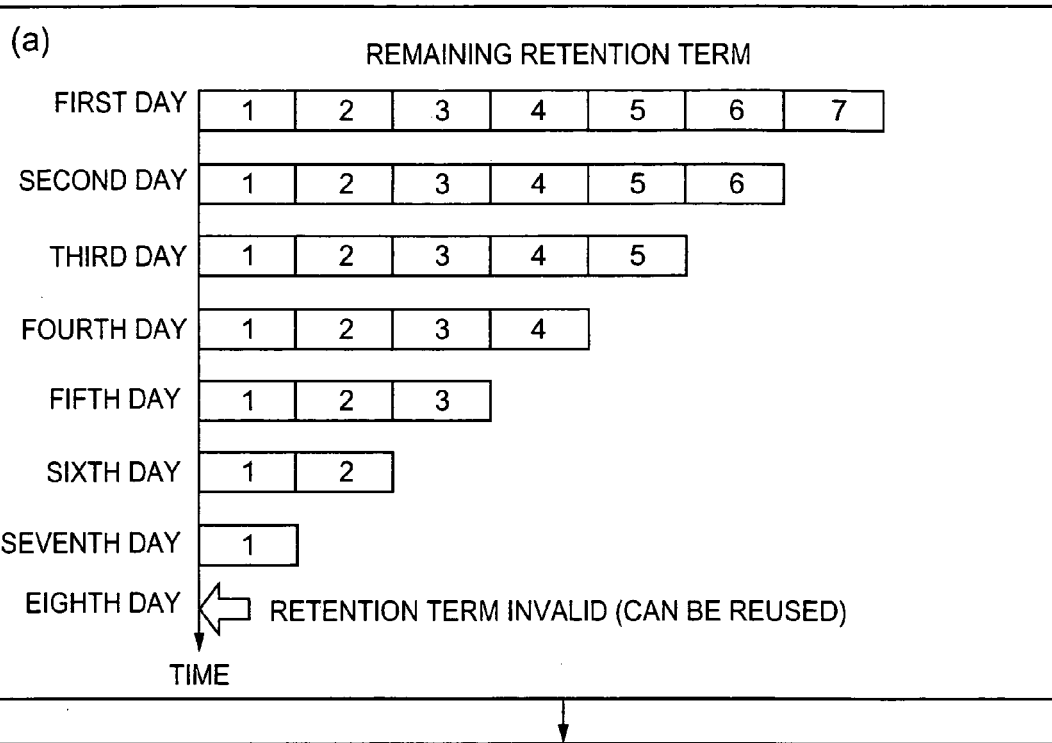
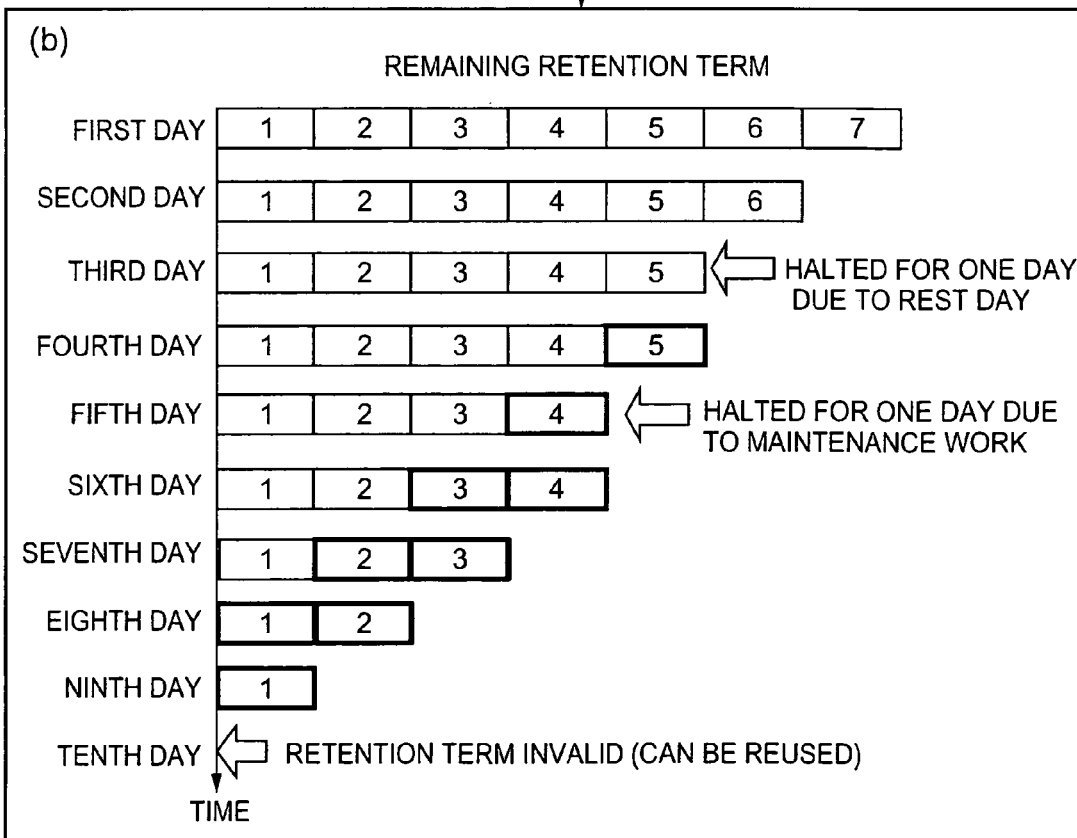

STORAGE SYSTEM AND DATA MANAGEMENT DEVICE FOR STORAGE SYSTEM

CROSS-REFERENCE TO RELATED APPLICATIONS

This application relates to and claims priority from Japanese Patent Application No. 2004-256536 filed on Sep. 3, 2004, the entire disclosure of which is incorporated herein by reference.

BACKGROUND OF THE INVENTION

The present invention relates to a storage system and a data management device for a storage system.

The storage system is constituted by comprising at least one or more storage device, known as a disk array subsystem, for example. This storage device provides a storage region based on a RAID (Redundant Arrays of Inexpensive Disks) system, wherein disk drives, such as hard disk drives, semiconductor memory devices, or the like, are arranged in an array configuration. A host computer (hereinafter, called "host") accesses the logical storage region provided by the storage device and reads or writes data.

The volume of data managed by businesses and organizations such as regional authorities, educational institutions, financial institutions, government and municipal offices, and the like, is growing steadily year on year, and some of this data is designated by the law or other regulations as data that must be kept in store for a prescribed number of years. Therefore, the system administrator selects the data that is to be stored, from the group of data accumulated in the storage system, and he or she backs up that data. One method for backing up data is known wherein a plurality of copy destination volumes of the same size of the copy source volume are prepared, for example, and data for respective generations is stored respectively in these respective copy destination volumes (Japanese Patent Laid-open No. 2004-046435).

In the patent referenced above, since an identical copy of the whole of the volume is saved, regardless of the size of the data that is to be saved, then the use efficiency of the storage region declines. Specifically, data of a prescribed size is generally saved by writing it to a storage medium of a fixed size, and therefore, in a storage system, a plurality of volumes of a fixed capacity are prepared and data is saved by writing it to these fixed-size volumes.

However, the size of the data to be backed up varies on a daily basis, depending on the frequency of use of the application programs, and the like. Therefore, it is necessary previously to set the size of the volume for saving data to a larger size than the data that is to be backed up. The size of the volume for saving data is established on the basis of past experience, for example. In this way, since a data saving volume is prepared in advance to a size that is larger than the predicted size of the data to be backed up, then wasted empty capacity is generated in the data saving volume and the use efficiency of the storage region declines. Moreover, since it is hard to predict the size of the data saving volume accurately in advance, then it is difficult to use the storage resources efficiently in the overall storage system.

SUMMARY OF THE INVENTION

Therefore, it is an object of the present invention to provide a storage system and a data management device for a storage system whereby the storage resources provided by the storage system can be used efficiently. Another object of the present invention is to provide a storage system and a data management device for a storage system whereby the storage resources provided by the storage system can be used efficiently, and whereby reliability and usability can be improved. Further objects of the present invention will become apparent from the following description of the embodiments.

In order to achieve the aforementioned objects, the data management device for a storage system according to the present invention is a data management device used in a storage system including a host device and a first storage device having a first logical volume used by the host device, comprising: a data size acquiring section for acquiring the data size of prescribed data that is to be subjected to prescribed processing, of the data stored in the first logical volume; a volume generation control section for generating a second logical volume of a size corresponding to the acquired data size, in the first storage device; and a data processing section for storing the prescribed data in the second logical volume thus generated.

For example, the host device, such as a mainframe computer or server, accesses the first logical volume belonging to the first storage device, and it reads out data from the first logical volume or writes data to the first logical volume. Here, the prescribed processing is, for example, archive processing, and the prescribed data is, for example, data that is to be archived. Furthermore, instead of archive processing, the prescribed processing may also be back-up processing, in which case, the prescribed data will be data that is to be backed up.

The data size acquiring section acquires the size of the data to be archived, from the data stored in the first logical volume. The volume generation control section generates a second logical volume of a size corresponding to the acquired data size, in the first storage device. The data processing section writes and saves the data to be archived, to the second logical volume. In this way, a second logical volume is generated in accordance with the size of the data to be archived, and hence the storage region can be used in a non-wasteful manner, compared to a case where volumes of a fixed size are prepared in advance.

A new second logical volume corresponding to the size of the data to be archived is generated each time an archive process is carried out with respect to the first logical volume, and furthermore, a switching control section may be provided for instructing a switching operation of the second logical volumes respectively generated by each archive process. In other words, for each archive process, a second logical volume corresponding to the size of the data to be archived is generated, respectively. By means of the switching control section, at least one of the plurality of second logical volumes can be used in a selective fashion.

The data processing section can establish prescribed attributes with respect to the data to be archived that is written to the second logical volume. A retention term for the data to be archived, and an access restriction, may be included in prescribed attributes. Here, the "retention term" is the time period during which the data to be archived must be saved. Furthermore, in order to prevent modification of the data to be archived, a read-only access restriction is established.

Moreover, the volume generation control section may delete a second logical volume for which the retention term has expired, and generate a second logical volume using the empty space created by this deletion.

Furthermore, the first storage device may comprise a reference clock section, and a correcting section for correcting the retention term established for the data to be archived, on the basis of a signal from this reference clock section. Here, rather than correcting the measurement value supplied by remaining time period measuring means (for instance, an internal timer), which measures the remaining time period of the retention term, the remaining time period of the retention term is corrected by shortening or extending the time period.

The volume generation control section can also execute back-up processing for causing the storage contents of the second logical volume to be stored in a third logical volume generated by means of the first storage device, an access restriction having the same content as the access restriction established in the second logical volume being set in the third logical volume. In other words, of the data stored in the first logical volume, the data that is to be archived is stored in the second logical volume, and a third logical volume is generated as a copy of this second logical volume. Thereupon, an access restriction having the same contents as the access restriction established for the second logical volume is also set for the third logical volume, namely, the copy destination volume.

The storage region where the logical volume is established is provided by a physical storage device. A physical storage device is, for example, a hard disk drive, a semiconductor memory drive, an optical disk drive, a magneto-optical disk drive, or the like. These physical storage devices have a usable lifespan, and they deteriorate as time passes. Therefore, it is also possible to provide a lifespan management section for counting the use time of each of the second logical volumes and outputting a warning signal if the use time thus counted has reached a previously established set time period.

The data to be archived that is stored in the second logical volume can be deleted from the first logical volume. If the host device requests access to data to be archived that has been moved to a second logical volume, then the host device accesses that data to be archived via the data management device.

For example, archive identification information for identifying the location of the data to be archived relating to an archive process is stored in the first logical volume each time the archive process is carried out. The host device provisionally accesses the first logical volume, acquires the archive identification information, and then sends a request for access to the archived data, to the data management device, by indicating the acquired archive identification information.

The first logical volumes and the second logical volumes do not all have to be located within the first storage device. For example, by connecting a second storage device having an external logical volume to the first storage device, and mapping the external logical volume to a prescribed storage layer of the first storage device, it is possible to use the external logical volume as either one or both of a first logical volume or a second logical volume. The first storage device does not have to comprise an intrinsic storage region itself, but rather, it may incorporate and use external storage regions exactly as if they were storage regions belonging to itself. Therefore, the first storage device does not necessarily have to be a disk array device, and it may be constituted by a high-performance intelligent switching device, for example.

The present invention may also be interpreted as an archive management method as described below, for example. Specifically, it is an archive management method comprising: a step of acquiring data to be archived; a step of detecting the data size of the data to be archived thus acquired; a step of generating an archive volume of a size equal to the detected data size; a step of writing the acquired data to be archived, to the generated archive volume; and a step of establishing an access restriction and a retention term for the archive volume to which the data to be archived has been written.

At least a portion of the means, functions and steps according to the present invention may be constituted by computer programs which are read in and executed by a microcomputer. Computer programs of this kind may be distributed by copying them onto a storage medium, such as a hard disk, optical disk, or the like. Alternatively, computer programs may also be supplied via a communications network, such as the Internet.

BRIEF DESCRIPTION OF THE DRAWINGS

FIG. 1 is an illustrative diagram showing the concept of an embodiment of the present invention;

FIG. 2 is a block diagram showing a general overview of a storage system;

FIG. 3 is an illustrative diagram showing the storage structure of the storage system;

FIG. 5 is an illustrative diagram showing the composition of a mapping table;

FIG. 6 is an illustrative diagram showing the composition of an empty capacity management table;

FIG. 7 is an illustrative diagram showing the composition of an LU management table;

FIG. 8 is an illustrative diagram showing the composition of an archive management parameter file;

FIG. 15 is an illustrative diagram relating to a fourth embodiment, showing a situation where a time disparity has arisen in the management of the progress of the retention terms;

DESCRIPTION OF THE SPECIFIC EMBODIMENTS

Figure 4A:
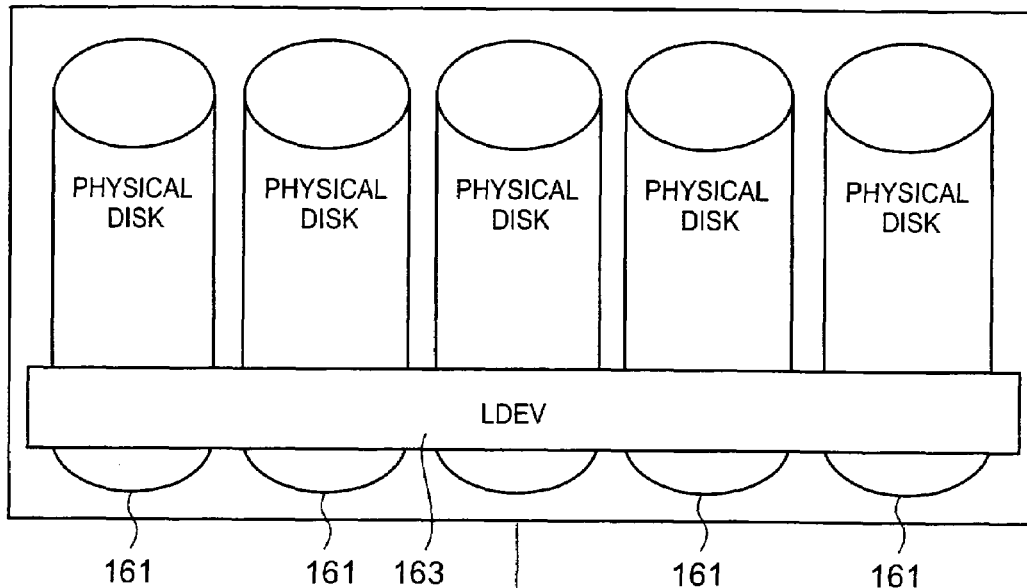
FIG. 4 is an illustrative diagram showing a state where volumes are generated in accordance with the data size that is to be processed.

Below, embodiments of the present invention are described with respect to the drawings. FIG. 1 is an illustrative diagram showing a schematic view of the general concepts of the present embodiment. As described below, the storage system according to the present embodiment may be constituted by means of an application server 1 forming a host device, an archive server 2 forming a data management device, and a first storage device 3 and a second storage device 4.

The application server 1 provides an application program 1A, such as electronic mail management software or database management software, for example. The application program 1A accesses the first logical volume LUa of the first storage device 3, and reads or writes data. This first logical volume LUa is a primary volume for the application program 1A.

An archive server 2 reads out and archives prescribed data of the group of data stored in the first logical volume LUa. Data corresponding to previously established conditions is set as data to be archived. The archiving conditions can be set as desired by indicating various data attributes, for example, file data having a prescribed filename (document name, etc.), electronic mail data sent or received on a particular day or within a particular time period, file data above or below a prescribed file size, electronic mail data having a file attachment, and the like.

When an execution time for archive processing has been reached, for example, when a prescribed time after the end of a work period has been reached, the archive server 2 acquires the data to be archived, via the application program 1A of the application server 1. More specifically, the archive server 2 requests the application program 1A of the application server 1 to read out data that corresponds to the archiving conditions.

In response to the request from the archive server 2, the application program 1A of the application server 1 accesses the first logical volume LUa and reads out the data that satisfies the archiving conditions. The data to be archived thus read out is sent from the application server 1 to the archive server 2. Here, if the data to be archived which satisfies the archiving conditions can be identified in logical block units, rather than file units, then the archive server 2 is able to access the first logical volume LUa directly and acquire the prescribed data group.

However, since archive processing is carried out in file units, the archive server 2 acquires the data to be archived via the application server 1 (S1). The archive server 2 saves the acquired data to be archived temporarily in a local memory or on a local disk, and detects the size of the data to be archived (S2). The archive server 2 instructs the first storage device 3 to generate an archive volume LUb having a volume size equal to the detected data size (S3). When the archive volume LUb has been generated, the archive server 2 mounts this volume LUb and writes the data to be archived to that volume LUb (S4). When writing of the data to be archived has been completed, the archive server 2 sets the access restriction and the retention term for the archive volume LUb (S5). For the access restriction, the data is set to "read only", in order to prevent alteration of the data. The retention term, on the other hand, is set to the period stipulated by the law or other relevant regulations.

The first storage device 3 generates an archive volume LUb of a designated size in response to the request from the archive server 2. Here, the archive volume LUb is not actually located within the first storage device 3, but rather it is located in a second storage device 4 connected to the first storage device 3.

In other words, the logical volume LUc belonging to the second storage device 4 is mapped to a virtual volume LUb in the first storage device 3. Thereby, although it appears as if the archive server 2 accesses the archive volume LUb directly, in actual fact, the data is transferred from the first storage device 3 to the second storage device 4, and then written to the volume LUc, which is a physical volume. The volume LUc, which is a physical volume, is controlled by the first storage device 3 and write access to the volume LUc is prohibited until the retention term set in the volume LUb has expired.

The controller 3A of the first storage device 3 comprises a timer 3B forming clock means used to manage the progress of the retention term. Similarly, the controller 4A of the second storage device 4 has a timer 4B forming clock means. Here, the timer 3B of the first storage device 3 is used as a master timer. The value of the master timer 3B is transferred to the controller 4A of the second storage device 4, as and when necessary. The controller 4A of the second storage device 4 compares the value indicated by the master timer 3B with the value indicated by its own timer 4B, and it corrects the retention term in accordance with the difference between these two values.

In this way, in the present embodiment, since an archive volume LUb is generated in accordance with the size of the data that is to be archived, then it is possible to make the volume size of the archive volume LUb equal to the size of the data to be archived, and hence the creation of wasted empty space can be prevented in advance. Therefore, it is possible to perform archive processing while making efficient use of the storage resources provided by the storage system, and furthermore, the operating costs of the storage system can be reduced.

Moreover, in the present embodiment, since a composition is adopted wherein the volume LUc belonging to the second storage device 4 provided externally to the first storage device 3 is incorporated into the first storage device 3, then volumes distributed throughout the storage system can be used in an efficient manner and hence archive processing can be carried out more efficiently.

Furthermore, in the present embodiment, since means for correcting the retention term are provided, then even if the power source of the second storage device 4 is interrupted, due to maintenance work, an extended holiday, or other such situation, it is still possible to terminate the period during which the data is saved, on the previously established day. If the retention term has expired, then the related volume LUb (LUc) is deleted and the empty storage region created thereby can be reused for new archive processing.

1. First Embodiment

FIG. 2 is a block diagram showing an approximate view of the general composition of a storage system. This storage system can be constituted by comprising, for example, an application server 10, an archive server 20, a management terminal 30, and a plurality of storage devices 100, 200.

The application server 10 may be constituted by a computer system, such as a server machine, personal computer, workstation, portable information terminal, or the like. Depending on the circumstances, it is also possible to use a main frame type host computer, instead of the application server 10. In the drawings, for the sake of convenience, one application server 10 is illustrated, but it is also possible to provide a plurality of application servers.

The application server 10 may be constituted by comprising, for example, communication sections 11 and 12, a CPU (Central Processing Unit) 13, a memory 14 and a local disk 15. One of the communication sections 11 serves to perform data communications with the archive server 20, via the communications network CN1. A LAN (Local Area Network), or the like, for example, may be used as the communications network CN1. The communications section 11 carries out data communications in file units, on the basis of TCP/IP (Transmission Control Protocol/Internet Protocol), for example.

The other of the communication sections 12 serves to perform data communications with the first storage device 100, via a communications network CN2. A SAN (Storage Area Network), or the like, for example, may be used as the communications network CN2. The communications section 12 carries out data communications in block units, on the basis of FCP (Fiber Channel Protocol), for example. Moreover, another communications protocol, such as iSCSI (internet Small Computer System Interface), or the like, may also be used. Furthermore, if the host computer is a mainframe type host, then data transfer is conducted in accordance with a communications protocol, such as FICON (Fiber Connection: registered trademark), ESCON (Enterprise System Connection: registered trademark), ACON-ARC (Advanced Connection Architecture: registered trademark), FIBARC (Fiber Connection Architecture: registered trademark), or the like.

The CPU 13 controls the operations of the application server 10. It is also possible to provide one or a plurality of hardware circuits used exclusively for specific data processing, in addition to the CPU 13. The memory 14 is constituted by a RAM (Random Access Memory), a ROM (Read Only Memory), and the like, for example. In the drawings, one memory 14 is illustrated, but the application server 10 comprises a volatile memory and a non-volatile memory. The local disk 15 is constituted by a hard disk drive, a semiconductor memory drive, an optical disk drive, or the like, for example.

The memory 14 stores application programs 16. Examples of an application program 16 include: an electronic mail management program, a database management program a file system, or the like. The application program 16 provides prescribed information processing services in response to a request from a plurality of client terminals, situated outside the scope of the drawings.

The archive server 20 is a computer system used exclusively to perform archive processing for the data group used by the application server 10. The application server 20 is constituted by a computer system, such as a server, personal computer, workstation, portable information terminal, or the like.

Similarly to the application server 10, the archive server 20 may be constituted by communications sections 21, 22, a CPU 23, a memory 24, and a local disk 25, for example. The communication section 21 serves to perform data communications with the application server 10, via the communications network CN1. The communication section 22 serves to perform data communications with the first storage device 100, via the communications network CN2. The CPU 23 controls all of the operations of the application server 20. The memory 24 stores various programs as described below. The local disk 25 temporarily stores the data to be archived.

An archive management program 26 and a disk array control program 27 are previously stored in the memory 24, for example. Moreover, the disk array control program 27 may also include a LU (logical volume) switching program 28 and a LU control program 29. The details of these respective programs are described further below with reference to flowcharts. The archive management program 26 carries out archive processing and the archive array control program 27 carries out control relating to the generation or switching of the logical volume used for archive processing.

The management terminal 30 is connected to the first storage device 100 via a communications network CN3, such as a LAN, for example. This management terminal 30 is a computer terminal which causes the data acquired from the SVP 170 of the first storage device 100 to be displayed on a screen of the terminal, or alternatively, instructs changes in the composition of the first storage device 100, and the like, via the SVP 170. A web browser (not illustrated) may be installed in this management terminal 30, for instance, in such a manner that instructions can be issued and information can be acquired via the web.

The first storage device 100 can be constituted by comprising, for example, a plurality of channel adapters (hereinafter, "CHA") 110, a plurality of disk adapters (hereinafter, "DKA") 120, a cache memory 130, a shared memory 140, a connection control section 150, a storage section 160, and an SVP 170, which are respectively described hereafter.

The CHA 110 controls the transmission and reception of data with the application server 10, the archive server 20 and the external second storage device 200, and it may be constituted by a microcomputer system comprising a CPU, memory and input/output circuit, for example. Each of the CHAs 110 may be provided with a plurality of communications ports 111 (see FIG. 3), and data may be exchanged independently and respectively via each of these communications ports 111. Each CHA 110 corresponds respectively one type of communications protocol, and is prepared in accordance with the type of communications protocol used by the application server 10. However, it is also possible for each of the CHAs 110 to be composed so as to correspond respectively to a plurality of communications protocols.

The DKA 120 controls transmission and reception of data with the storage section 160. Similarly to the CHA 110, the DKA 120 may be constituted by a microcomputer system comprising a CPU, memory and the like, for example. For example, each of the DKAs 120 accesses the respective disk drives 161 (see FIG. 3) and performs data read out or data writing, by converting a logical block address (LBA) designated by the application server 10 or the archive server 20 into an address on a physical disk. The functions of the CHAs 110 and the functions of the DKAs 120 may also be integrated into one or a plurality of controllers.

The cache memory 130 stores write data written from the application server 10 or the archive server 20, and read data read out from the application server 10 or archive server 20. The cache memory 130 may be constituted by a volatile or a non-volatile memory, for example. If the cache memory 130 is constituted by a volatile memory, then desirably, a memory back-up is performed by means of a battery power source, or the like, which is not illustrated. Although not shown in the drawings, the cache memory 130 may be constituted by two regions, namely, a read cache region and a write cache region, and the data stored in the write cache region may be stored in a multi-layered fashion. In other words, since read data is also present on the disk drive 161 in exactly the same form, then even if this read data happens to be lost, it simply needs to be read out again from the disk drive 161, and hence there is no need for multi-layered storage. On the other hand, write data is only present in the cache memory 130 of the storage device 100, and therefore, from the viewpoint of reliability it is desirable to store it in a multi-layered fashion. Ultimately, the decision whether or not to store the cache data in multiple layers depends on the specifications.

The shared memory (which may also be called the control memory) 140 may be constituted by a non-volatile memory, or it may be constituted by a volatile memory. Control information, management information, and the like, such as the mapping table T1 described below, for example, is stored in the shared memory 140. Information, such as this control information, and the like, can be managed in a multi-layered fashion by means of a plurality of memories 140. The mapping table T1 is used to incorporate volumes belonging to the second storage device 200, into the first storage device 100. One example of this mapping table T1 is described further below.

Here, the shared memory 140 and the cache memory 130 may be constituted respectively by separate memory packages, or the cache memory 130 and the shared memory 140 may be provided in the same memory package. Furthermore, one portion of the memory may be used as a cache region and another portion thereof may be used as a control region. In other words, the shared memory and the cache memory may also be constituted as the same memory.

A connection control section (switching section) 150 respectively connects together the respective CHAs 110, the respective DKAs 120, the cache memory 130 and the shared memory 140. Thereby, all of the CHAs 110 and the DKAs 120 may respectively access the cache memory 130 and the shared memory 140, in an independent fashion. The connection control section 150 may be constituted as an ultra-high-speed cross-bar switch, or the like, for example.

The storage section 160 is constituted by a plurality of disk drives 161. The storage section 160 may be provided in the same frame as the controller sections, such as the respective CHAs 110 and the respective DKAs 120, or it may be provided in a separate frame from the controller sections.

A plurality of disk drives 161 may be provided in the storage section 160. For the disk drives 161, it is possible to use an FC disk (fiber channel disk), a SCSI (Small Computer System Interface) disk, a SATA (Serial AT Attachment) disk, or the like. Moreover, the storage section 160 does not have to be constituted by disk drives of the same type, and it is also possible to combine disk drives of a plurality of different types.

Here, in general, the performance declines sequentially, from an FC disk, to a SCSI disk to a SATA disk. It is possible, for example, to use different types of disk drive according to the state of use of the data, in such a manner that data which is accessed frequently (data of high value, or the like) is stored in a high-performance FC disk, and data which is accessed infrequently (data of low value, or the like) is stored in a low-performance SATA disk. A plurality of logical storage regions 164, 164A can be provided in the physical storage regions provided by the respective disk drives 161. The composition of these storage regions is described further below.

The SVP (Service Processor) 170 is connected respectively to each of the CHAs 110 and the DKAs 120, by means of an internal network CN11, such as a LAN. In the diagram the SVP 170 is only connected to the CHAs 110, but the SVP 170 can also be connected respectively to each of the DKAs 120. The SVP 170 gathers the various statuses within the storage device 100 and supplies them to the management terminal 30, either directly or after processing.

The first storage device 100 which provides virtual volumes is an access point for processing data input and output requests from the application server 10, and it is connected respectively to the second storage device 200 via the communications network CN2. The drawing depicts a state where one storage device 200 is connected to the first storage device 100, but the configuration is not limited to this and a plurality of storage devices may be connected to the first storage device 100.

The second storage device 200 may be constituted, for example, by comprising a controller 210, a communications port 211 for connecting with the first storage device 100, and a disk drive 220. The controller 210 performs the function of the CHA 110 and DKA 120 described above, and controls the transmission and reception of data with the first storage device 100 and the disk drive 220, respectively.

The second storage device 200 may have the same or substantially the same composition as the first storage device 100, or it may have a different composition to the first storage device 100. The second storage device 200 is able to perform data communications with the first storage device 100, based on a prescribed communications protocol (for example, FC, iSCSI, or the like), and it should comprise a storage drive (storage device), such as a disk drive 220. As described hereafter, the logical volume 230 belonging to the second storage device 200 is mapped to a prescribed level of the first storage device 100, thereby allowing it to be used as if it were an internal volume of the first storage device 100.

In the present embodiment, an example is illustrated wherein a hard disk is used as a physical storage drive, but the present invention is not limited to this. Apart from a hard disk, it may also be possible to use a semiconductor memory drive, a magnetic tape drive, an optical disk drive, a magneto-optical disk drive, or the like, as a storage drive.

FIG. 3 is a compositional diagram focusing on the logical storage structure of the storage system. Firstly, the composition of the first storage device 100 will be described. The storage structure of the first storage device 100 can be divided broadly into the physical storage layer and the logical storage layer, for example. The physical storage layer is constituted by a PDEV (Physical Device) 161, which is a physical disk. The PDEV corresponds to a disk drive.

The logical storage layer can be constituted by a plurality of layers (for example, layers of two types) The first logical layer may be constituted by a VDEV (Virtual Device) 162. The other logical layer may be constituted by a LDEV (Logical Device) 163. The LDEV 163 corresponds to a logical volume.

The VDEV 162 may be constituted by grouping together a prescribed number of PDEVs 161, in order to form, for instance, one group of four (3D+1P), or one group of eight (7D+1P). One RAID storage region is formed by the collection of storage regions provided respectively by the PDEVs 161 belonging to a group. This RAID storage region forms a VDEV 162.

Here, all of the VDEVs 162 are not actually provided directly on PDEVs 161, but rather, some of the VDEVs 162 can be generated in the form of a virtual intermediate device. A virtual VDEV 162 of this kind forms a recipient for mapping a LU (Logical Unit) belonging to the external storage device 200.

The LDEVs 163 may be provided on at least one or more VDEV 162. The LDEVs 163 may be constituted by dividing the VDEV 162 at fixed lengths or variable lengths. In the present embodiment, as described hereinafter, LDEVs 163 having the volume size required for archiving are obtained by dividing a VDEV 162 in accordance with the size of the data that is to be archived.

In the case of an open type host, such as the application server 10 or archive server 20, since the LDEV 163 is mapped to the LU 164, the application server 10 recognizes that the LDEV 163 is a single physical disk. The open type application server 10 accesses a desired LDEV 163 by specifying the LUN (Logical Unit Number) and the logical block address. Accordingly, in FIG. 2 and other drawings, the LU which is recognized by the application server 10, or the like, is indicated as an logical volume.

The LU 164 is a device that can be recognized as a logical unit in the SCSI system. Each of the LUs 164 can be connected to the application server 10 or archive server 20 via a port 111A. Each of the LUs 164 can be associated respectively with at least one or more LDEV 163. By associating a plurality of LDEVs 163 with one LU 164, it is also possible to expand the LU size, in a virtual fashion.

The CMD (Command Device) 165 is a specialist LU used in order to receive command and status information between a program running on the application server 10 and the archive server 20 and the controller of the storage device (CHA 110 and DKA 120). Commands from the application server 10 and the like are written to the CMD 165. The controller of the storage device executes processing corresponding to the command written to the CMD 165 and writes execution results as status information to the CMD 165. The application server 10 and the like read out and confirm the status written to the CMD 165 and then write the contents of the processing that is to be executed, to the CMD 165. In this way, the application server 10 and the archive server 20 can send commands of various types to the storage device 100, via the CMD 165.

The second storage device 200 is connected to an initiator port (External Port) 111B used for external connection to the first storage device 100, via the communications network CN2. The second storage device 200 comprises a plurality of PDEVs 220 and LDEVs 230 established in the storage region provided by the PDEVs 220, and each of the LDEVs 230 is associated with a LU 240.

The LDEVs 230 of the second storage device 200 are mapped to VDEVs 162 of the first storage device 100 via the LUs 240. For example, "LDEV e1" in the second storage device 200 is mapped to the "VDEV2" of the first storage device 100, and an "LDEV2" for archiving is established on this "VDEV2". Furthermore, for example, "LDEV e2" in the second storage device 200 is mapped to the "VDEV3" of the first storage device 100, and an "LDEV3" for archiving is established on this "VDEV3".

By mapping the physical volumes (LDEVs) belonging to the second storage device 200 to a prescribed logical layer of the first storage device 100 in this way, it is possible to make volumes 230 located externally to the first storage device 100 appear exactly as if there are volumes belonging to the first storage device 100 itself, from the viewpoint of the application server 10 or archive server 20. Moreover, by mapping to an intermediate device, namely the VDEV 162, rather than mapping directly to the LU of the first storage device 100, it is possible to form LDEVs of a desired size which matches the size of the data to be archived. The method for incorporating volumes situated outside the first storage device 100, into the first storage device 100, is not limited to example described above.

As shown in FIG. 3, the application server 10 accesses "LU1" which is a primary volume, and reads or writes data. By writing a switching command to the CMD 165, the archive server 20 generates archiving LUs 164A, and it switches use between a plurality of archiving LUs 164A. In the present embodiment, the function of using a previously grouped plurality of LUs 164A, by switching between these LUs, is called a "juke box" function 180.

Figure 4B:
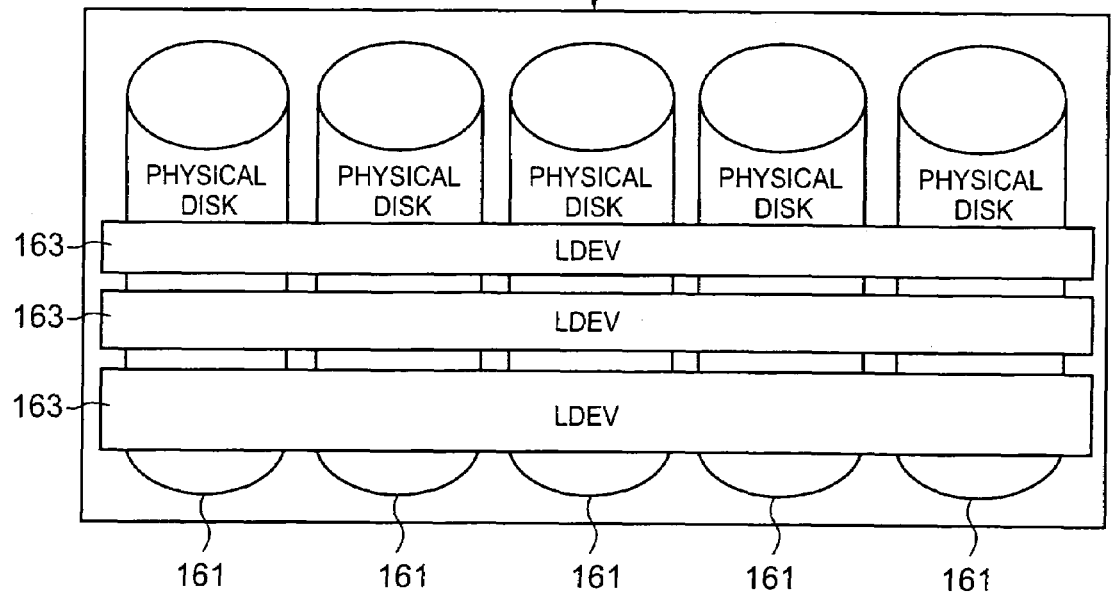

FIG. 4 is an illustrative diagram showing a schematic view of a method for generating an LDEV 163. As shown in FIG. 4(*a*), one storage region (VDEV) is formed by assembling a prescribed number of PDEVs 161, which are physical storage devices. The diagram shows a situation where one RAID group (VDEV) is formed by four data disks and one parity disk. As shown in FIG. 4(*b*), in the present embodiment, an LDEV 163 of a desired size is formed in the physical storage region, in accordance with the size of the data to be archived. Moreover, as described hereinafter, when the retention term becomes zero and the LDEV 163 no longer needs to be saved, then it is deleted. The storage region of the deleted LDEV 163 reverts to the empty storage region in the RAID group, and it is reused.

FIG. 5 is an illustrative diagram showing the composition of a mapping table T1. The mapping table T1 is used to map volumes belonging to the second storage device 200, into the first storage device 100. The mapping table T1 can be stored in the shared memory 140 of the first storage device 100.

The mapping table T1 is constituted by respectively associating information, such as the LUN, LDEV number, maximum slot number (capacity) for LDEV, VDEV number, maximum slot number (capacity) for VDEV, device type and path information, for example. The path information can be divided broadly into internal path information indicating a path to a storage region (PDEV 161) inside the first storage device 100, and external path information indicating a path to a volume belonging to the second storage device 200. The external path information may include a WWN (World Wide Name) and a LUN, for example.

FIG. 6 shows one example of an empty capacity management table T2 for managing the empty space in the storage system, separately, for each RAID group. This empty capacity management table T2 can be stored in the shared memory 140, for example.

The empty capacity management table T2 may be constituted, for example, by respectively associating a RAID group number, the total storage capacity of that RAID group, the unused storage capacity in that RAID group, and the storage category of that RAID group. The storage category means, for example, the physical location and type of the disk drive (PDEV) 161 constituting the RAID group. In the diagram, "internal FC" indicates that the RAID group is constituted by FC disks inside the first storage device 100, and "external SATA" indicates that the RAID group is constituted by SATA disks inside the second storage device 200.

FIG. 7 is an illustrative diagram showing one example of an LU management table T3. The LU management table T3 is used to manage the respective LUs 164, 164A in the storage system, and it may be stored in the shared memory 140, for example.

The LU management table T3 may be constituted by respectively associating, for example, the number of the RAID group to which an LU belongs, the LU number established for that LU, the storage capacity of the LU, the access attributes established for the LU (for example, read-only or read/write), the remaining time period of the retention term set for the LU, the archive data on which the data to be archived was stored in the LU, the time period for which the LU has been mounted on the current day (day mount time), and the accumulated mount time for that LU.

Here, the "retention term" is the time period during which the data to be archived stored in the LU must be saved. When the remaining time period of the retention term becomes zero, the saving time period ends and the storage region used for that LU can be released. Furthermore, in the present embodiment, since a plurality of archive LUs 164A are used on a switching basis, by means of a juke box function, there are differences between the mount times for each of the LUs.

FIG. 8 is an illustrative diagram showing one example of an archive management parameter file (hereinafter, called "parameter file"). The parameter file F1 is used to manage archive LUs 164a by forming them into groups of a plurality of archive LUs which can be used on a switching basis. The parameter fie F1 is stored in the archive server 20, for example.

The parameter file F1 may be constituted by respectively associating, for example, a juke box name for identifying a juke box function, the number of the CMD 165 used to control this juke box function, the archived LU number registered in that juke box, and the retention term established for the juke box. In the present embodiment, retention terms are established respectively for each of the juke boxes. More specifically, retention terms are established in juke box units; for instance, separate retention terms are established for the juke box storing the archive data for three-year storage and for the juke box storing the archive data for one-year storage. Stated conversely, juke boxes are prepared respectively for each of the different retention terms. However, the invention is not limited to this, and it is also possible to prepare juke boxes in accordance with the type of application program, or the like.

Figure 9:
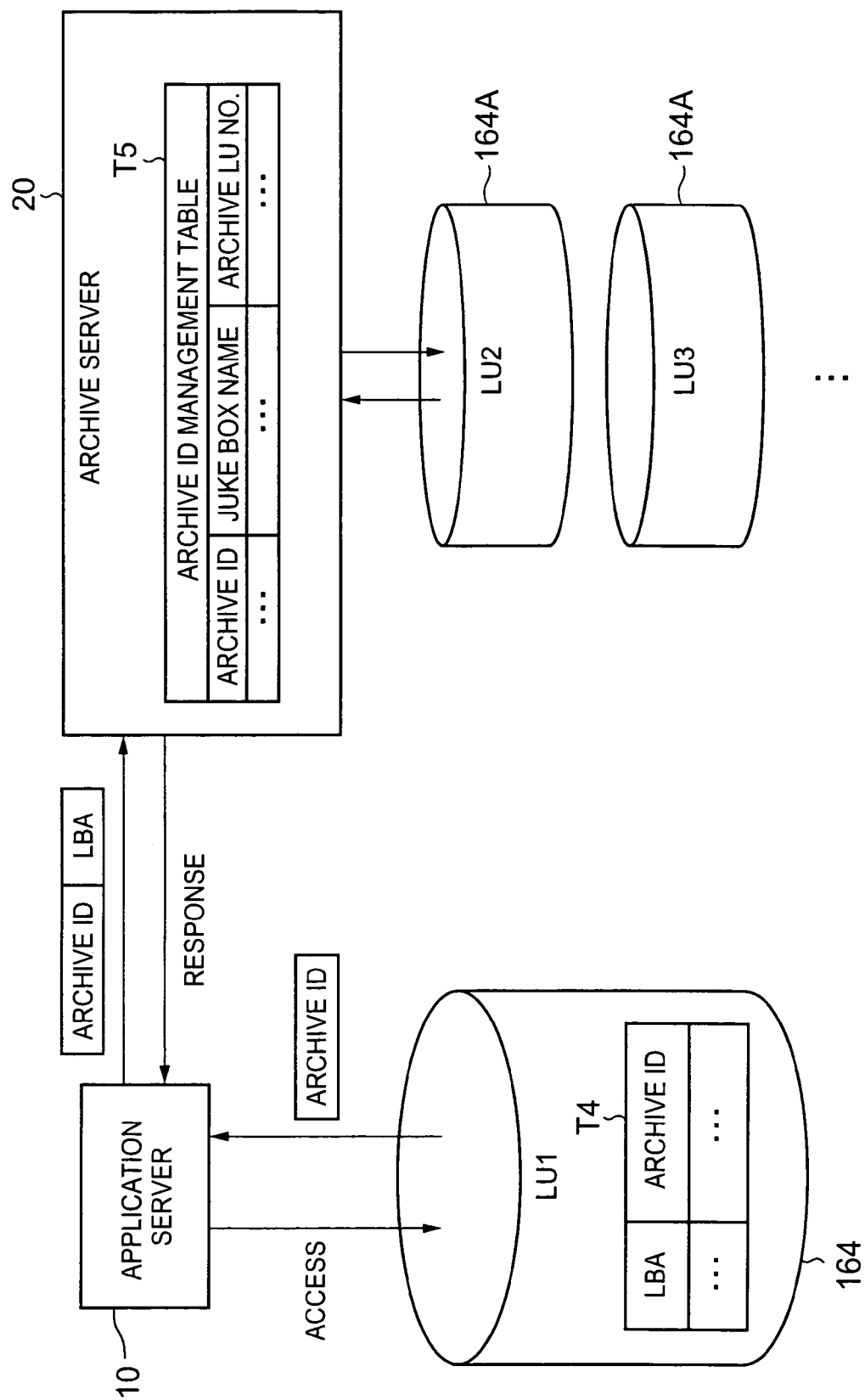
FIG. 9 is an illustrative diagram showing a situation where archived data is accessed.

FIG. 9 is an illustrative diagram showing a schematic view of a method for accessing data that has already been archived. The data to be archived, of the data stored in the primary volume "LU1" is copied to the archive volume "LU2". When archiving has been completed, this data to be archived is deleted from the primary volume "LU1".

The archive ID information T4 is stored in the primary volume "LU1" instead of the data that has been archived and deleted. The archive ID management information T4 can be constituted by associating the address of data that has been archived (the LBA: Logical Block Address), and the archive ID (archive identification information) which identifies the archive destination of the data stored at that address.

The application server 10 does not recognize which of the data has been archived and moved, and it sends a request to access the archived data, to the primary volume "LU1". In response to this access request, the storage device 100 returns the archive ID related to the requested data.

The application server 10 associates the archive ID with the address of the desired data and makes an enquiry to the archive server 20. The archive server 20 holds an archive ID management table T5. This archive ID management table T5 can be constituted by associating, for example, an archive ID, a juke box name, and an archive LU number.

The archive server 20 refers to the archive ID management table T5 in accordance with the inquiry from the application server 10 and it confirms the location of the requested data. In order to access the archive LU where the requested data is located, the archive server 20 controls the prescribed juke box and switches and mounts the desired archive LU. The archive server 20 then reads out the data from the archive LU and sends this data to the application server 10.

Consequently, the user does not have to distinguish whether the data to be archived is located in the primary volume "LU1", or whether it is located in the archive volume "LU2", and he or she is able to access the data seamlessly.

The foregoing provided an example, but the present invention is not limited to this example. In short, in the present embodiment, if the data to be archived is moved from the primary volume "LU1" to the archive volume "LU2", then information identifying the destination to which this data has been moved is stored in the primary volume "LU1". Therefore, the application server 10 requests data of the archive server 20 on the basis of this information, and acquires the desired data via the archive server 20.

Figure 10:
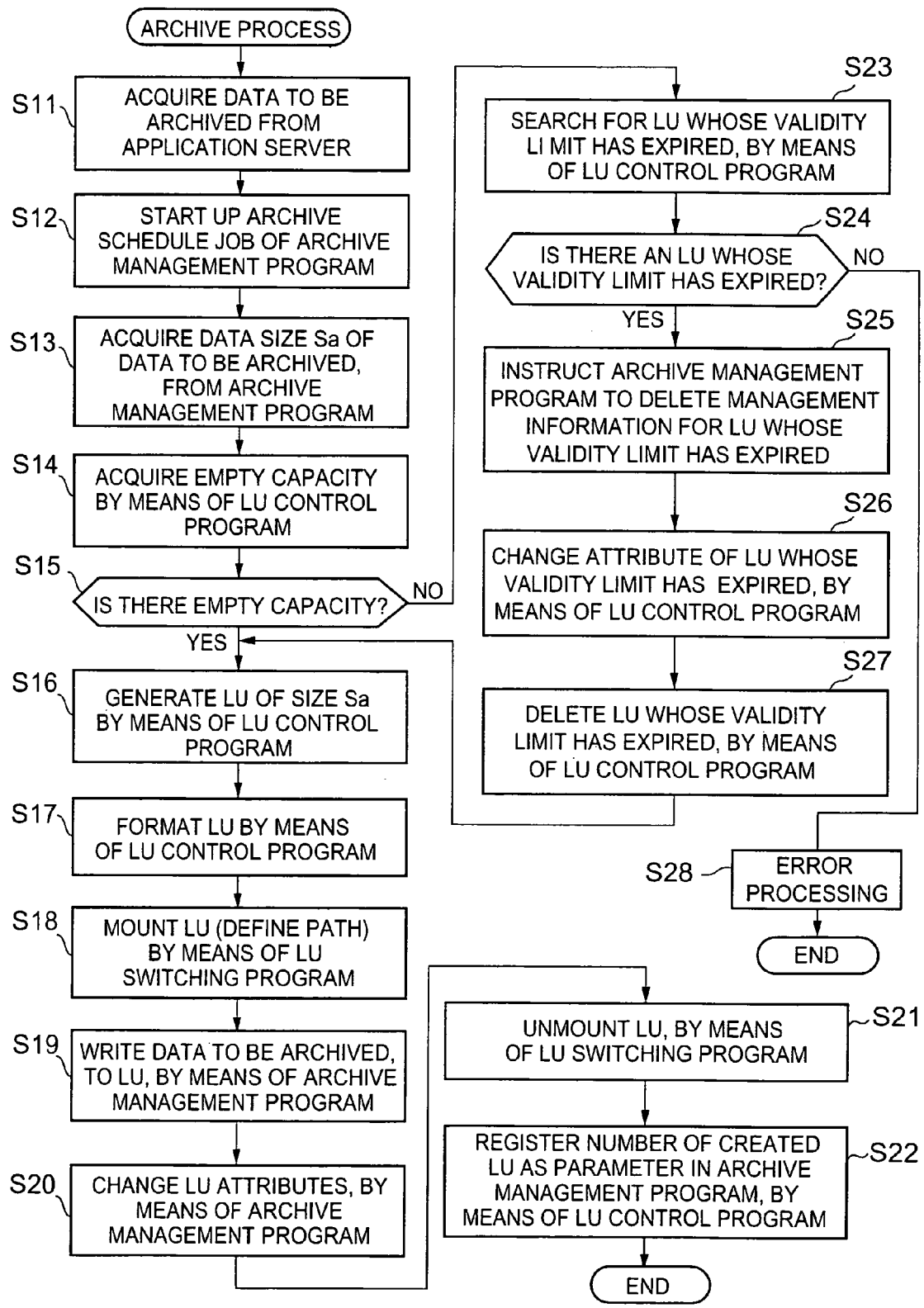
FIG. 10 is a flowchart of archive processing.

FIG. 10 is a flowchart of an archive process according to the present embodiment. This process is started when a prescribed timing is reached, for example. The prescribed timing means, for example, when a prescribed time has been reached, or when an explicit instruction has been received from the user.

Firstly, the archive server 20 acquires the data to be archived via the application server 10 (S11). More specifically, the archive server 20 reports the archiving conditions to the application server 10, and the application server 10 reads out the data corresponding to these archiving conditions (the data to be archived), from the primary volume "LU1" and sends it to the archive server 20. The archive server 20 saves the data to be archived thus acquired on the local disk 25.

In the archive server 20, an archive scheduling job of the archive management program 26 is initiated (S12). The archive management program 26 acquires the data size Sa of the data to be archived that has been stored on the local disk 25 (S13).

The LU control program 29 enquires about the empty capacity in the first storage device 100, and acquires the current empty capacity (S14). The LU control program 29 judges whether or not there is empty capacity equal to or exceeding the data size Sa of the data to be archived (S15). If sufficient empty capacity to permit generation of an archive volume is detected (S15: YES), then the LU control program 29 generates an archive volume having a volume size equal to the size of the data to be archived (S16). Here, the volume size of the archive volume and the data size of the data to be archived do not have to be precisely matching, and it is sufficient for them to be matching to the extent that no wasted empty capacity is generated in the archive volume.

The LU control program 29 formats the secured archive volume (S17) and carries out preparations for data writing. Subsequently, the LU switchover control program 28 defines the connection path to the formatted archive volume, and this archive volume is mounted on the archive server 20 (S18). Hereinafter, the mounted archive volume will be called "archive LU 164A" in the description.

The archive management program 26 writes the data to be archived stored on the local disk 25 to the mounted archive LU 164A (S19). When writing of the data to be archived has been completed, the archive management program 26 changes the attributes of the archive LU 164A (S20). More specifically, a read-only access restriction is established for the LU 164A where the archive data is stored, and furthermore, a previously determined retention term is also established for the data. The LU switching program 28 then unmounts the archive LU 164A whose attributes have been changed (S21). The LU control program 29 registers the LU number of the archive LU 164A in the parameter file F1 (S22).

On the other hand, if empty capacity equal to or exceeding the size of the data to be archived is not available in the first storage device 100 (S15: NO), then the LU control program 29 searches for an LU 164A whose retention term has expired (S23).

If there is an LU 164A whose retention term has expired (S23: YES), then the archive management program 26 requests the first storage device 100 to delete the management information of the archive LU 164A whose retention term has expired (S24). The LU control program 29 then changes the access restriction of the archive LU 164A whose retention term has expired and which therefore no longer needs to be saved, from "read-only" to "read/write" (S26), whereupon it deletes the LU 164A (S27). By this means, the empty capacity required in order to store the data to be archived is secured, and the process advances to S16.

If no archive LU 164A having an expired retention term is detected (S24: NO), then it is not possible to perform archive processing, and a notification to this effect is sent to the user, whereupon the process terminates (S28). Upon receiving this error report, the user may investigate expansion of the disk drives 161, or addition or substitution of a storage device, or the like, for example.

If there is insufficient empty capacity (S15: NO), then all of the archive LUs 164A whose retention terms have expired may be deleted together, or alternatively, they may be deleted in a step fashion, according to the number of LUs required. In the latter case, the procedure should advance from S27 to S15.

In this way, according to the present embodiment, an archive volume is generated of approximately equal size to the data size of the data that is to be archived, and therefore it is possible to prevent the generation of wasted empty capacity in the archive volume, and hence the storage resources of the storage system can be used efficiently.

Moreover, in the present embodiment, if there is insufficient empty capacity in the storage device 100, then any LUs 164A whose retention term has expired and which therefore no longer need to be saved are detected, and these unnecessary LUs 164A are deleted and reused, and hence the storage resources can be used more efficiently.

2. Second Embodiment

Figure 11:
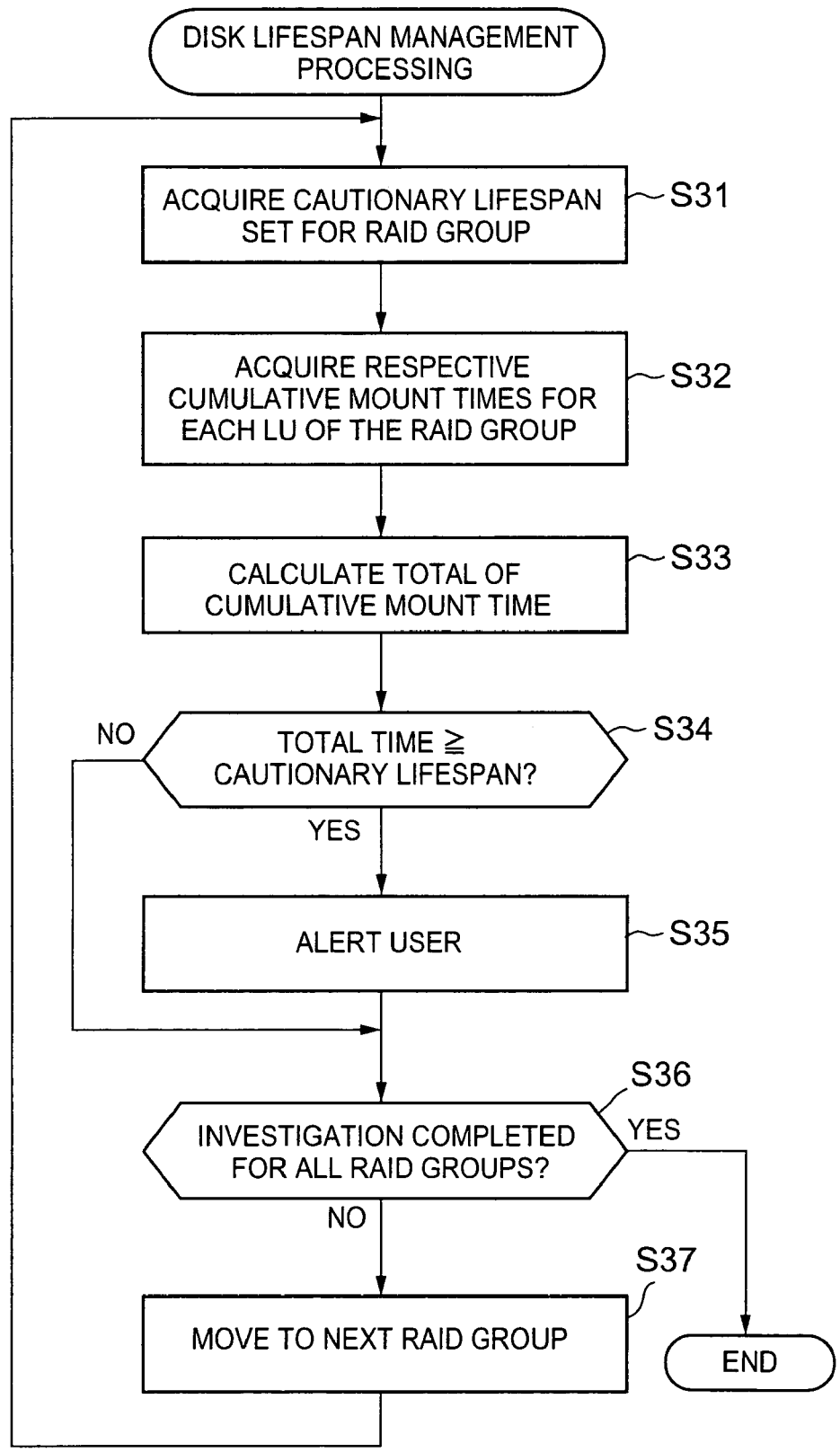
FIG. 11 is a flowchart of disk lifespan management processing relating to a second embodiment of the invention.

A second embodiment of the present invention is now described on the basis of FIG. 11. The following embodiments, including the present embodiment, correspond to modifications of the first embodiment. The characteristic feature of the present embodiment lies in the fact that the lifespan of the disk drives 161 is managed.

FIG. 11 is a flowchart showing lifespan management processing for a disk drive. This processing may be executed within the archive server 20, for example. However, the invention is not limited to this, and it may also be executed in the application server 10 or the storage device 100.

Here, for example, a SATA disk has a shorter product lifespan than an FC disk. For example, if an FC disk has a product lifespan of 5 years, then a SATA disk may have a product lifespan of approximately 3 years, which is shorter than that of the FC disk. Moreover, whereas an FC disk can be read from or written to at any hour of the day, in the case of a SATA disk, even if the disk is allowed to remain in a powered state 24 hours a day, permission for read or write operations is limited to approximately 8 hours per day.

On the other hand, certain electronic data must be stored for a long period of time, such as several years to several decades, in accordance with various legal requirements, and the like. Therefore, if data that must be stored for a long period of time in this way is stored on a SATA disk, which is inexpensive but has a short product lifespan, then disk lifespan management becomes necessary. Therefore, in the present invention, disk lifespan management processing such as that illustrated in FIG. 11 is carried out appropriately for each RAID group.

The LU control program 29 acquires a product lifespan previously established for a particular RAID group (S31). For example, in a case where the RAID group is made up of SATA disks, then since the read/write time per day is 8 hours and the guaranteed product lifespan is three years, then the total time period during which that RAID group can be used will be: 8 hours×365 days×3 years=8760 hours. Therefore, allowing a margin of 5% with respect to this maximum value (8760 hours), the cautionary lifespan is taken to be 8322 hours (8760 hours×95%).

The LU control program 29 acquires the respective cumulative mount times for each of the LUs belonging to the RAID group (S32), and calculates the total of these cumulative mount times (S33). The LU control program 29 compares the total use time of the RAID group with the cautionary lifespan (S34).

If the total use time is equal to or greater than the cautionary lifespan (S34: YES), then the LU control program 29 reports that the time for replacing the disks has been reached, to the user, by means of the archive management program 26 (S35). If the total use time has not yet reached the cautionary lifespan (S34: NO), then the LU control program 29 skips step S35.

The LU control program 29 judges whether or not lifespan investigation has been carried out for all of the RAID groups (S36), and if there is a RAID group that has not yet been investigated (S36: NO), then it moves to the next RAID group (S37) and repeats the processing in S31 to S36. If lifespan investigation has been completed for all the RAID groups (S36: YES), then the LU control program 29 terminates this processing.

In this way, according to the present embodiment, the product lifespan of the disk drives 161 is investigated appropriately for each RAID group. Therefore, it is possible to store archive data, which must be saved for a long period of time, by using inexpensive disk drives having a short product lifespan, and the reliability of archive processing can be maintained.

3. Third Embodiment

Figure 12:
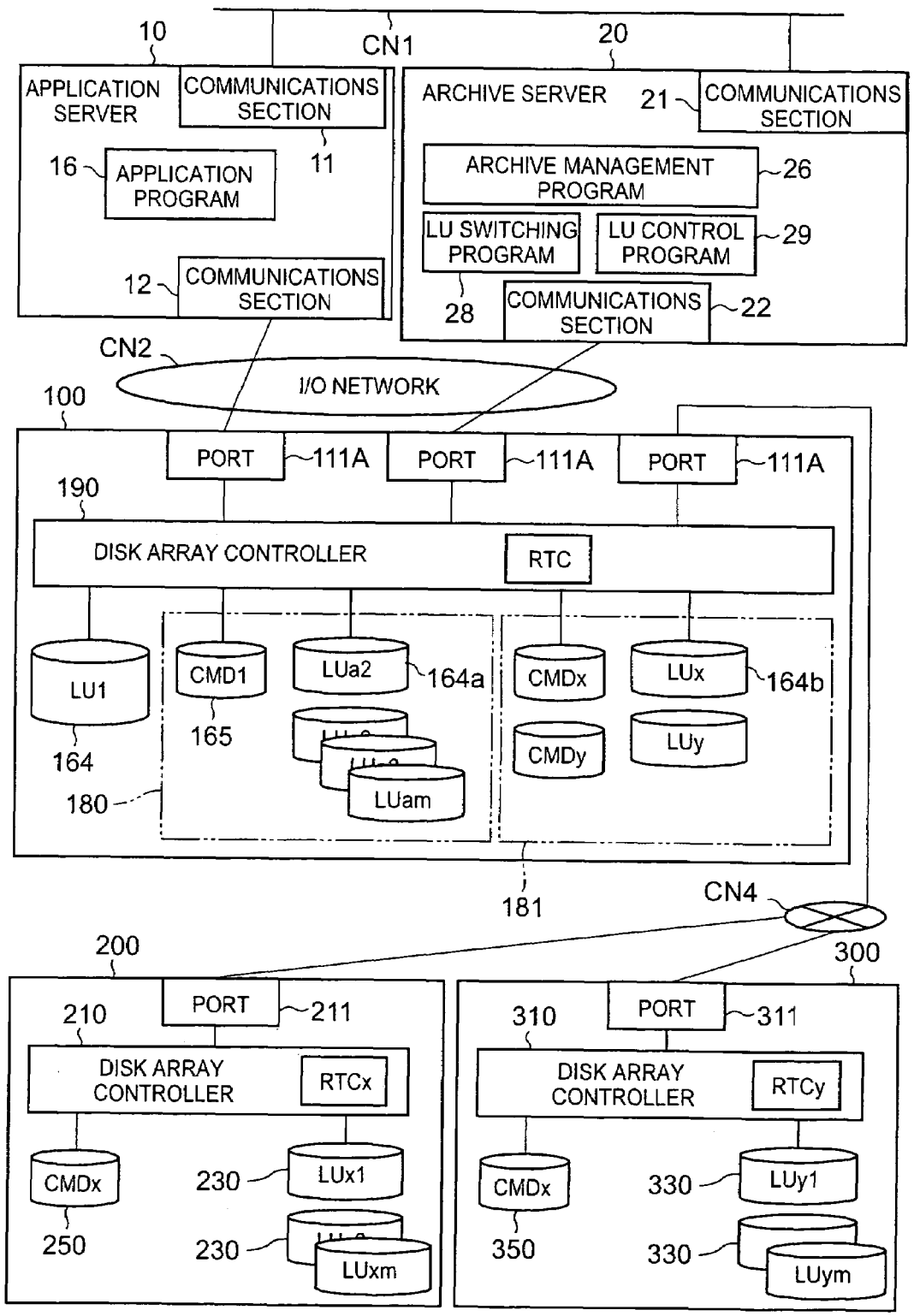
FIG. 12 is a block diagram showing the general composition of a storage system according to a third embodiment.
Figure 13:
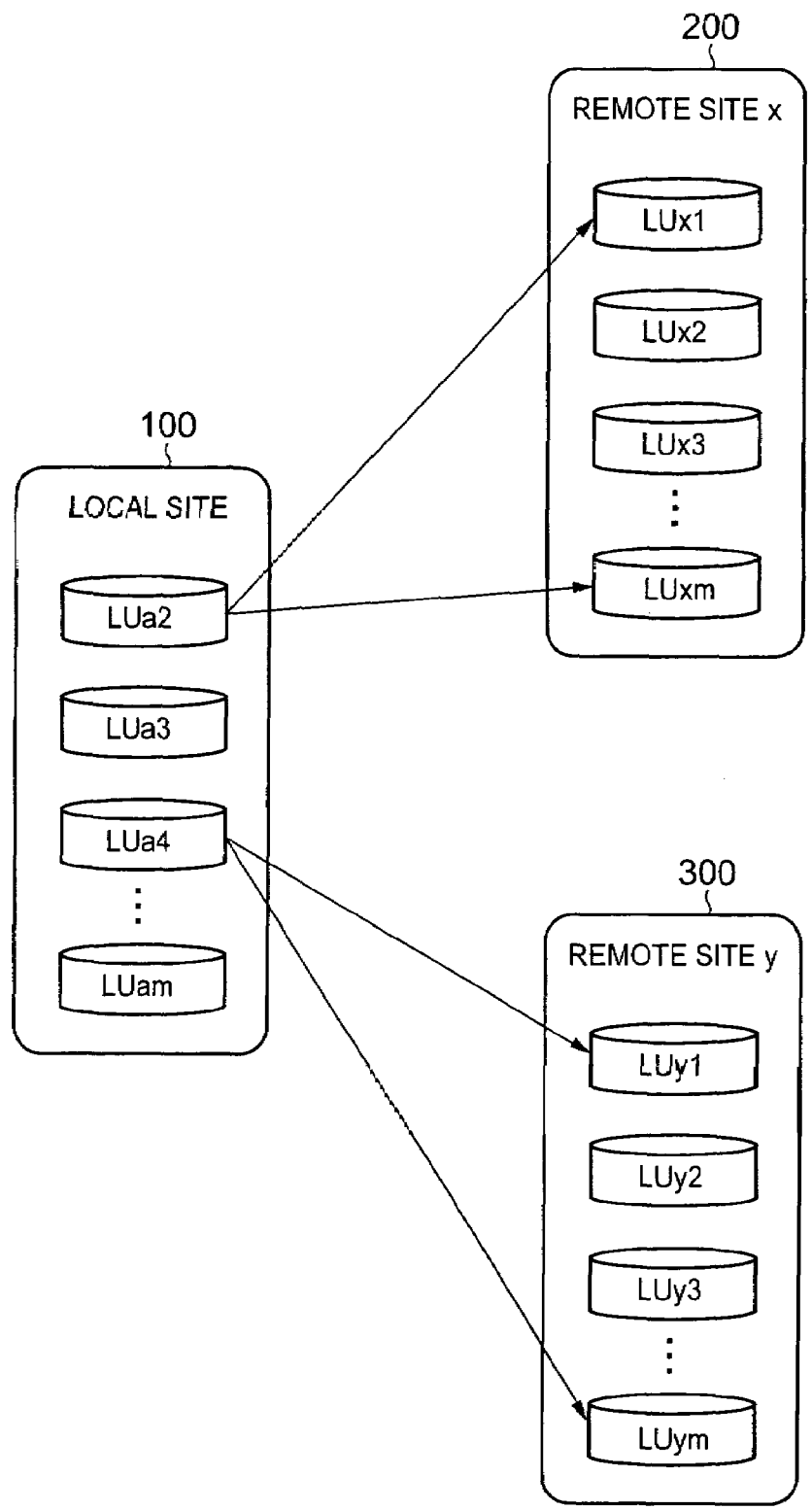
FIG. 13 is an illustrative diagram showing a schematic view of a situation where a copy of a volume at a local site is generated at a remote site.
Figure 14:
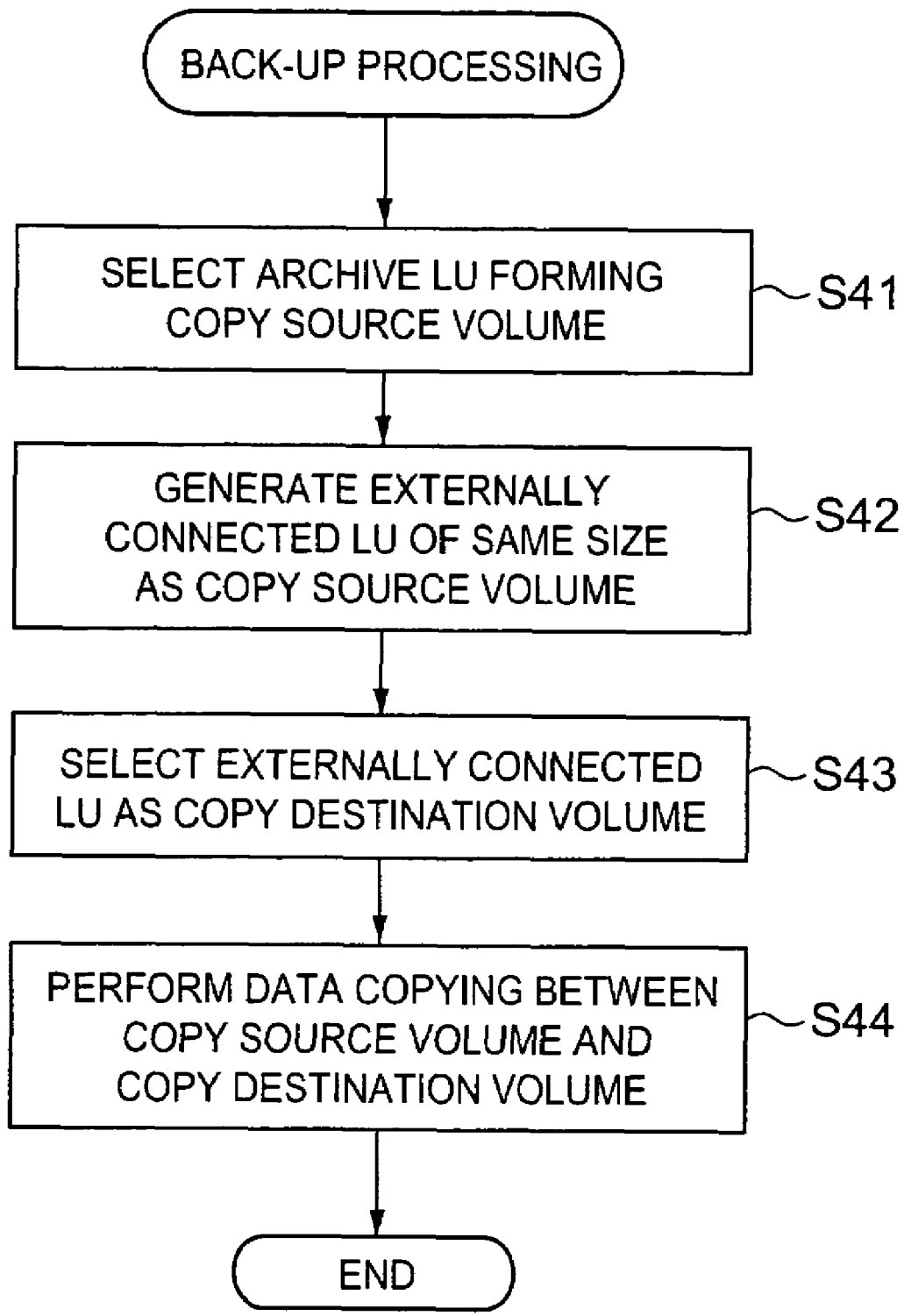
FIG. 14 is a flowchart showing back-up processing.

A third embodiment of the present invention is now described on the basis of FIG. 12 to FIG. 14. The characteristic feature of the present embodiment lies in the fact that resistance to faults is increased by generating a back up of the archive LU 164, at a remote site.

FIG. 12 is an illustrative diagram showing the general overview of a storage system according to the present embodiment. In the present embodiment, a third storage device 300 is provided additionally. Similarly to the second storage device 200, this third storage device 300 comprises, for example, a port 311, a disk array controller 310, a plurality of volumes 330 and a CMD 350.

In the present embodiment, it is supposed that the first storage device 100 is situated at a local site, and the second storage device 200 and the third storage device 300 are respectively situated at separate back-up sites. The first storage device 100, second storage device 200 and the third storage device 300 are connected via a communications network CN4, such as the Internet or a dedicated circuit, for example.

In the first storage device 100, there are provided a juke box function 180 for switching the archive LU 164A forming the back-up source, and a juke box function 181 for switching the volume forming the back-up destination. The juke box function 181 is able to select any of the volumes 230, 330 belonging respectively to the second storage device 200 or the third storage device 300, as desired, and it comprises a separate dedicated CMD for each of the storage devices 200, 300.

Consequently, as shown by the schematic illustration of a back-up system in FIG. 12, by using the juke box function 180, it is possible to select at least any one of the archive LUs in the local site as a back-up source. Furthermore, by means of the juke box function 181, it is possible to select a volume situated in either a remote site x where the second storage device 200 is located or a remote site y where the third storage device 300 is located, as a back-up destination.

FIG. 14 is a flowchart showing an overview of back-up processing. Firstly, the archive LU which is to form the copy source (back-up source) is selected (S41), and then a copy destination volume of the same size as the copy source volume is generated at a remote site selected from the respective remote sites (S42). Thereupon, the copy destination volume thus generated is selected by the juke box function 181 (S43), and a remote copy is carried out between the copy source volume and the copy destination volume (S44).

According to the present embodiment, it is possible to generate a copy of an archive LU generated in accordance with the size of the data to be archived, at a remote site, and hence resistance to faults is improved.

4. Fourth Embodiment

Figure 16:
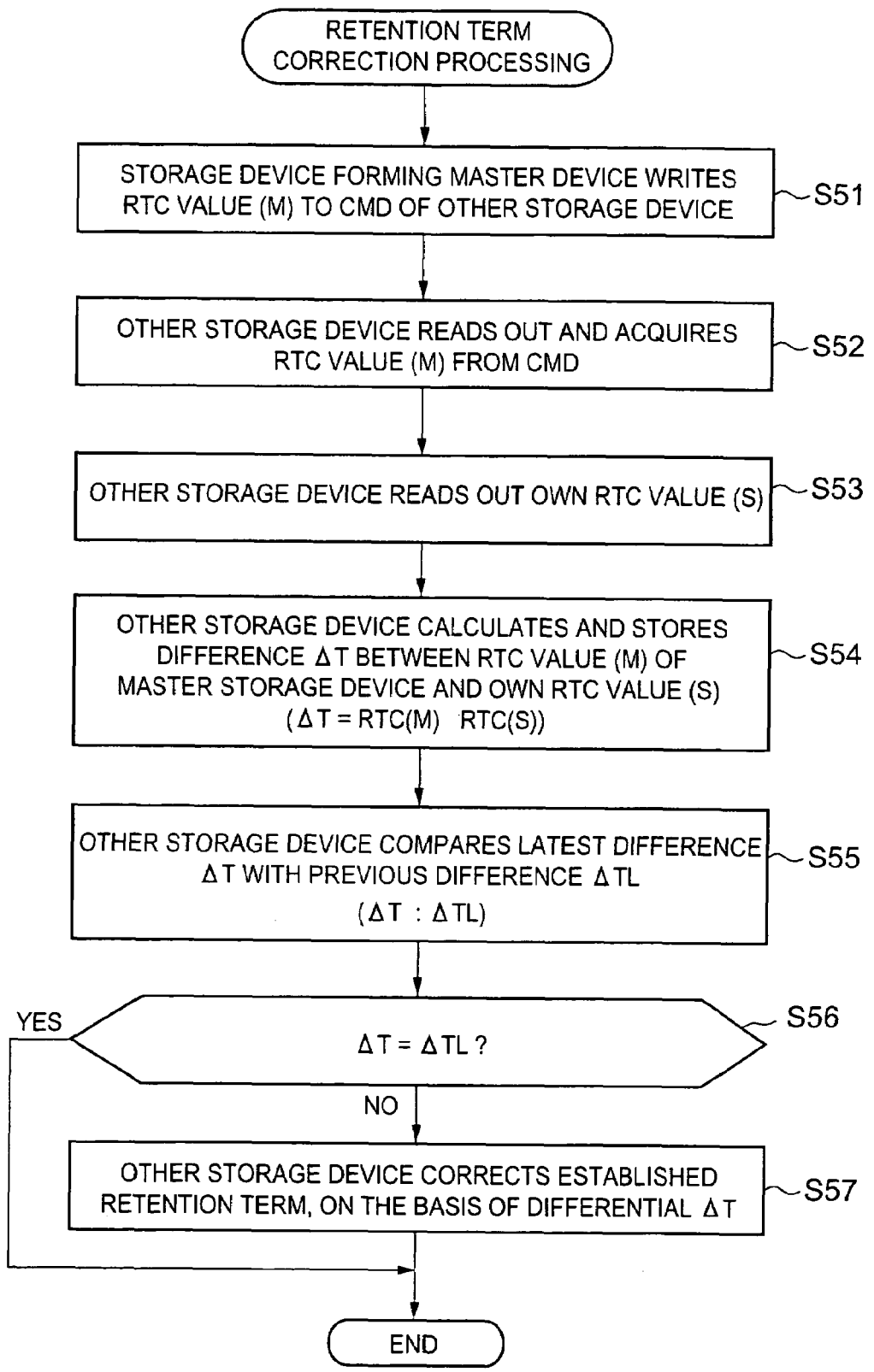
FIG. 16 is an illustrative diagram showing a process for correcting the retention term.

A fourth embodiment of the present invention is now described on the basis of FIG. 15 and FIG. 16. The characteristic feature of the present embodiment lies in the fact that the retention terms can be corrected automatically.

A prescribed retention term is established in the archive LU, in accordance with the characteristics of the data held therein. The storage device 100 monitors the expiry of the retention terms, and if the remaining time period of the retention term has reached 0, then that volume is deleted and can be reused.

The retention term is counted by a count-down system, in accordance with the count value of a clock function (RTC) provided by a microprogram of the disk array controller. This RTC only operates when the power to the storage device is switched on, in other words, when it is in a "Ready state". Therefore, if the power supply to the storage device has been switched off, due to maintenance work, an extended holiday period, a fault, or the like, then the progress of the retention term is halted during that off period. Consequently, if the storage system is constituted by a plurality of storage devices 100, 200, 300, time discrepancies will arise between the respective storage devices. These discrepancies between storage devices are difficult to predict, and therefore it is not possible accurately to identify the date on which the retention term expires (the day on which the protection period for the archive data ends), for each storage device individually.

FIG. 15(a) indicates the trend in the remaining time period of the retention term in a state where the storage device has no power off time. If it is supposed that the remaining time period of the retention term at a particular point in time is 7 days, then the retention term will become invalid on the eighth day following that time point.

FIG. 15(b) indicates the trend in the remaining time period of the retention term in a state where power off time does occur in the storage device. For example, it is supposed that the power supply to the storage device was turned off for a whole day due to a holiday, on the third day, and furthermore, the power supply to the storage device was turned off for a whole day due to maintenance work, on the fifth day. The operation of the RTC is halted due to this period during which the power supply was switched off, totaling two days, and as a result, the day on which the retention term expires is delayed by two days and becomes the tenth day. Therefore, in the case illustrated in FIG. 15(b), the archive LU is protected for two days longer than the initially scheduled date, and hence the storage region is used wastefully for the time corresponding to this disparity.

Therefore, in the present embodiment, the RTC of a particular storage device is designated as a master RTC (a reference RTC), amongst the respective RTCs of the plurality of storage devices, and the reference value of this RTC is transmitted to each of the other storage devices, and the retention terms therein are corrected accordingly.

FIG. 16 is a flowchart showing a process for correcting the retention term. Firstly, the storage device 100 forming the master device writes its own RTC value (M) to the CMD of the other storage devices 200 and 300 (S51).

The controllers 210 and 310 of the other storage devices 200 and 300 read out and acquire the RTC value (M) from their respective CMDs (S52). These other storage devices 200 and 300 then read out their own respective RTC values (S) (S53), and calculate and store the difference, ΔT, between the RTC value (M) and the RTC value (S54).

The other storage devices 200 and 300 compare the latest difference, ΔT, calculated at S54 with the previous difference, ΔTL (S55), and judge whether or not these values are matching (S56). If the values are not matching (S55: NO), then this indicates that a time disparity has arisen between the master storage device 100 and the other storage devices 200 and 300. Therefore, the other storage devices 200 and 300 rewrite the established retention terms, on the basis of the latest differential value, ΔT (S57) More specifically, in the example shown in FIG. 15(b), the remaining time period of the retention term is shortened by two days, which corresponds to the time period during which the power supply was switched off. Accordingly, the protection time period expires and the archive LU becomes reusable, on the initially scheduled date.

In this way, according to the present embodiment, in an storage system comprising a plurality of storage devices 100, 200 and 300, even if a time disparity arises in the management of the progress of the retention term, due to maintenance work, a fault, or the like, it is still possible to correct the established retention terms managed by the other storage devices 200 and 300, by reference to the RTC value of the storage device 100 that has been established as a master device. Therefore, protection of archive LUs is terminated and the archive LUs become available for reuse, on the originally scheduled date, and in combination with the composition in the first embodiment, this allows the storage resources of the storage system to be used in an even more efficient manner.

5. Fifth Embodiment

Figure 17:
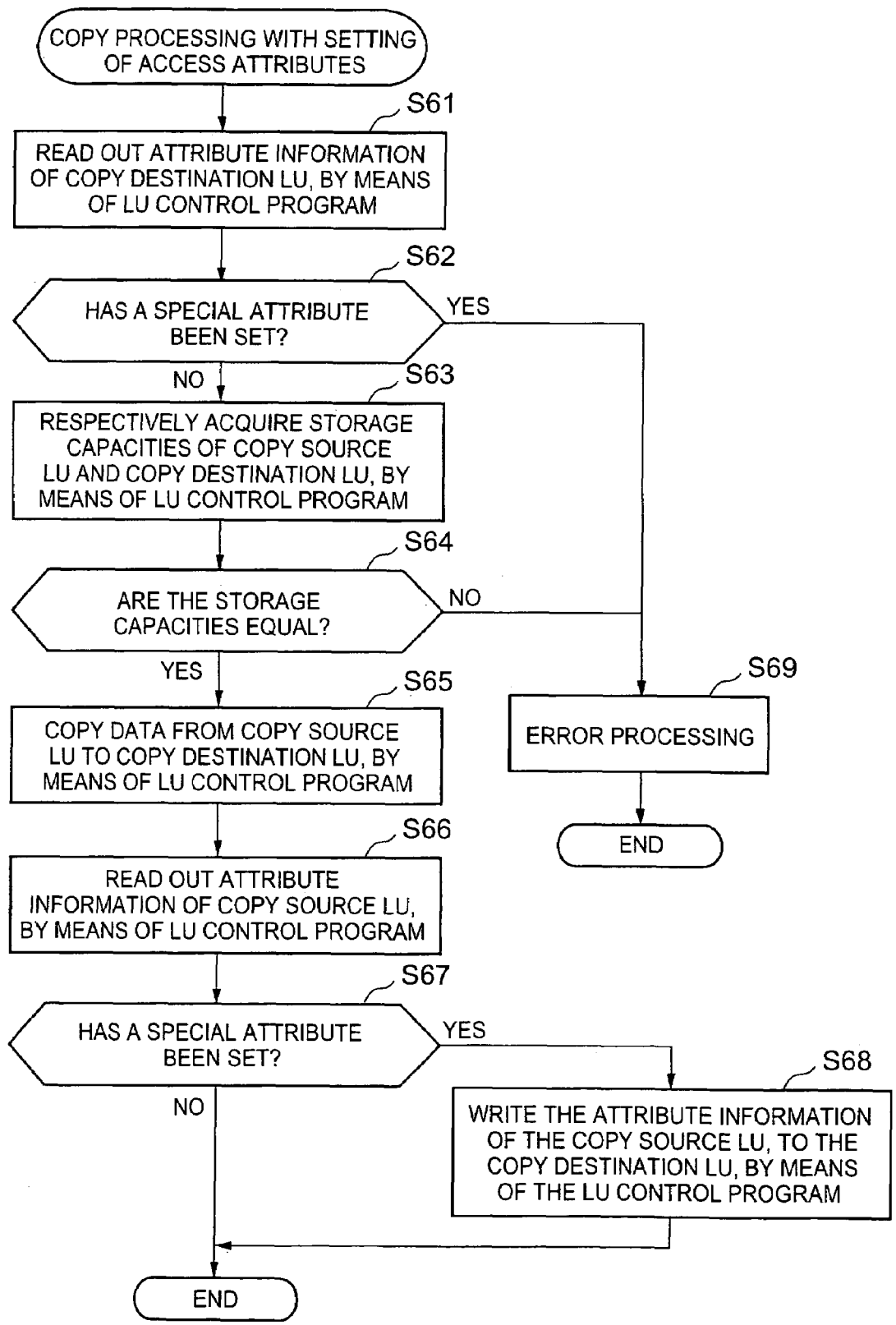
FIG. 17 is a flowchart relating to a fifth embodiment showing copy processing for establishing the same access attribute as the copy source volume, for the copy destination volume.

A fifth embodiment of the present invention is now described on the basis of FIG. 17. The characteristic feature of the present embodiment lies in the fact that when a back-up of the archive LU is made, for example, a prescribed attribute (the access restriction) of the attributes set for that archive LU is automatically established in the copy destination volume.

Firstly, the attribute information for the copy destination volume is read out by the LU control program 29 (S61), and it is judged whether or not a special attribute has been set (S62). Here, a special attribute means an attribute other than a normal attribute. For example, a normal attribute is a state where both read and write operations are permitted, and a special attribute may be, for example, read-only, protect (a state where the LU is concealed and no response is made to inquiry commands), ReadCapacity 0 (a state where the capacity is concealed by sending a response indicating that the capacity is 0, in reply to a capacity inquiry), S-VOL Disable (a state where the volume is disabled for use as a copy destination volume when volumes are being replicated), and the like.

If a special attribute has not been established for the copy destination volume (S62: NO), then the storage capacity of the copy source volume and the storage capacity of the copy destination volume are respectively acquired (S63), by means of the LU control program 29, and it is judged whether or not these storage capacities are equal (S64). If the two volume sizes are matching (S64: YES), then the data is copied from the copy source volume to the copy destination volume, by means of the LU control program 29 (S65).

After copying the storage contents of the copy source volume to the copy destination volume, the LU control program 29 reads out the attribute information of the copy source volume (S66) and judges whether or not a special attribute has been established in the copy source volume (S67). If a special attribute has been set for the copy source volume (S67: YES), then the LU control program 29 sets an attribute having the same contents as the special attribute established for the copy source volume, in the copy destination volume, and it then terminates processing (S68). If a special attribute has not been established for the copy source volume (S67 NO), then processing terminates directly.

If a special attribute has been established in the copy destination volume (S62: YES) or if the copy source volume and the copy destination volume are not of matching size (S64: NO), then it is not possible to carry out data copying, and hence a notification to this effect is reported to the user and processing is terminated (S69).

According to the present embodiment, it is possible to set the attribute established for a copy source volume, automatically, in the copy destination volume, after data has been moved. Accordingly, when data migration is carried out, for example, there are no omissions in setting up access restrictions, and hence ease of use is improved yet further.

6. Sixth Embodiment

Figure 18:
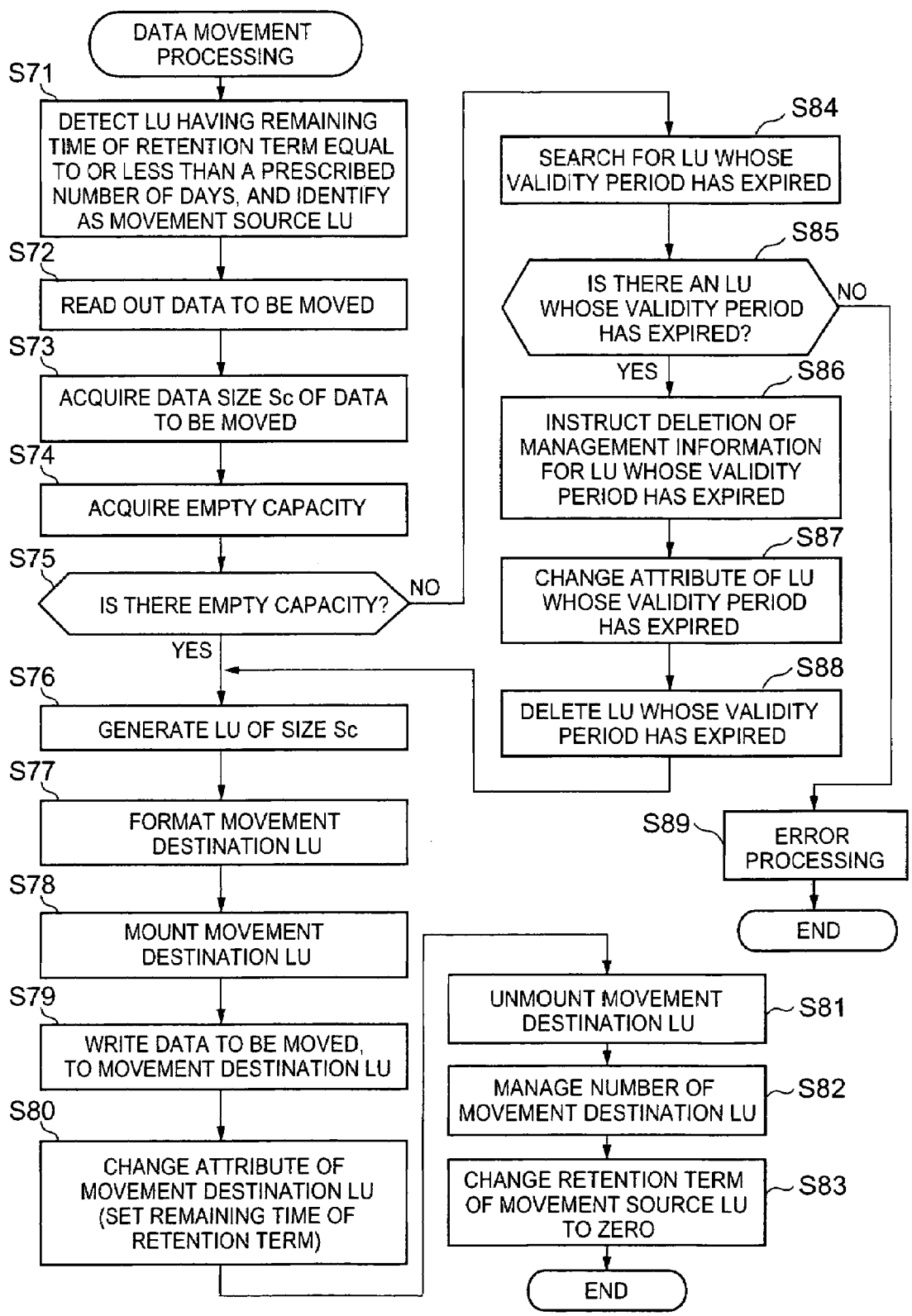
FIG. 18 is a flowchart relating to a sixth embodiment, showing data movement processing.

A sixth embodiment is now described on the basis of FIG. 18. The characteristic feature of the present embodiment lies in the fact that data is relocated inside the storage system, on the basis of the remaining time period of the retention term. Furthermore, in the present embodiment, an example of a case where the archive server 20 controls the relocation of the data is described, but the invention is not limited to this and the relocation may also be carried out by another computer device, such as the application server 10.

FIG. 18 is a flowchart showing a data movement process for relocating data. In general, the value of data declines as time passes. Therefore, archive data having a small remaining time period of the retention term can be regarded as data having reduced information value. If data of reduced value remains located in high-performance volumes consisting of FC disk, or the like, then the storage region available for storing data of higher value is reduced accordingly. Consequently, it is desirable for archive data of reduced value to be moved to a volume constituted by less expensive disks.

Therefore, the archive server 20 detects an archive LU for which the remaining time period of the retention term has fallen to or below a previously established number of days and identifies this archive LU as a movement source volume (S71), and it then reads out the data to be moved and saves it to the local disk 25. Thereupon, the archive server 20 acquires the data size Sc of the data to be moved that is stored on the local disk 25 (S73), and it makes an inquiry to the first storage device 100 with regard to the empty capacity (S74).

Here, the empty capacity for creating the movement destination volume is determined with reference to an inexpensive storage region, such as that of a previously designated SATA disk, or the like. By this means, data stored in an expensive volume, such as an FC disk, can be relocated to a less expensive volume, by using the remaining time period of the retention term as a trigger for this relocation.

The archive server 20 judges whether or not there is empty capacity equal to or exceeding the data size Sc of the data to be moved (S75). If empty capacity permitting the generation of a movement destination volume has been detected (S75: YES), then the archive server 20 generates a movement destination volume having a volume size equal to that of the data to be moved (S76).

The archive server 20 formats the movement destination volume thus secured (S77), mounts the movement destination volume on the archive server 20 (S78), and writes the data to be moved, which has been saved on the local disk 25, to the destination volume (S79).

When writing of the data to be moved has been completed, the archive server 20 changes the attribute of the movement destination volume (S80). In other words, it establishes a read-only access restriction for the movement destination volume, and it also sets the remaining time period of the retention term. More specifically, the remaining time period of the retention term established in the movement source volume, rather than initial value of the retention term, is set in the movement destination volume. Consequently, the protection time period of the data to be moved is not extended.

The archive server 20 unmounts the movement destination volume (S81), registers the related LU number in a data migration management file (S82), and then changes the retention term of the movement source volume to zero (S83). Therefore, after relocation of the data, the movement source volume can be reused.

If empty capacity equal to or exceeding the size of the data to be moved is not available (S75: NO), then the archive server 20 searches for a volume (LU) whose retention term has expired (S84), requests deletion of the management information relating to the volume whose retention term has expired (S85: YES, S864), changes the access restriction for that volume to a normal attribute (S87), and then deletes the volume (S88). By this means, the empty capacity required in order to store the data to be moved is secured, and the process then advances to S76. If no volume having an expired retention term is detected (S85: NO), then it is not possible to carry out data movement processing, and a notification to this effect is reported to the user, whereupon processing is terminated (S89).

In this way, according to the present embodiment, it is possible to judge the value of data on the basis of the remaining time period of the retention term, and to relocate the data to volumes corresponding to the value of the data, and therefore the ease of use is improved yet further. The condition for executing data relocation is not limited to a case where the remaining time period of the retention term has fallen to or below a prescribed number of days, and it may also relate to a case where the expired time period since the date of archiving has reached a prescribed number of days.

The present invention is not limited to the embodiments described above. It is possible for a person skilled in the art to make various additions, modifications, or the like, without departing from the scope of the present invention.

What is claimed is:

1. A data management device used in a storage system including a host device and a first storage device having a first logical volume used by the host device, the data management device comprising:
a transfer-determination unit adapted to examine a predetermined retention period of data stored in the first logical volume, and to designate a transfer processing of the data when a period remaining for the predetermined retention period becomes less than a predetermined amount;
a data size acquiring section for acquiring the data size of the data that is to be subjected to the transfer processing, of the data stored in said first logical volume;
a volume generation control section for having said first storage device generate a second logical volume of a size corresponding to said acquired data size; and
a data processing section for storing said data in said second logical volume thus generated.

2. The data management device for a storage system according to claim 1, wherein said transfer processing is archive processing and said data is data that is to be archived.

3. The data management device for a storage system according to claim 2, wherein a new second logical volume corresponding to the data size of the data to be archived is generated, each time said archive processing is carried out with respect to said first logical volume; and
the data management device comprises a switching control section for instructing a switching operation of said second logical volumes generated for each of said archive processings.

4. The data management device for a storage system according to claim 2, wherein said data processing section establishes prescribed attributes with respect to said data to be archived that is written to said second logical volume.

5. The data management device for a storage system according to claim 4, wherein said prescribed attributes includes an archive retention period and an access restriction for said data to be archived.

6. The data management device for a storage system according to claim 5, wherein said volume generation control section is capable of deleting a second logical volume for which the retention period has expired, and generating a new second logical volume using the empty region created by said deletion.

7. The data management device for a storage system according to claim 5, wherein said first storage device comprises: a reference clock section, and a correcting section for correcting said retention period established for said data to be archived on a basis of a signal from the reference clock section.

8. The data management device for a storage system according to claim 2, wherein said volume generation control section is also capable of executing back-up processing for causing the storage contents of said second logical volume to be stored in a third logical volume generated by said first storage device, and wherein an access restriction with the same content as the access restriction established in said second logical volume is set in said third logical volume.

9. The data management device for a storage system according to claim 3, comprising a lifespan management section for counting the use time of each of said second logical volumes and outputting a warning signal if the use time thus counted has reached a previously established set time period.

10. The data management device for a storage system according to claim 2 wherein said host device is caused to access said data to be archived that has been moved to said second logical volume, in response to an access request from said host device.

11. The data management device for a storage system according to claim 10, wherein archive identification information for identifying the location of said data to be archived relating to an archive process is stored in said first logical volume each time said archive process is carried out, and said host device is caused to access said data to be archived that has been stored in said second logical volume, in response to an access request containing this archive identification information.

12. The data management device for a storage system according to claim 1, wherein a second storage device having an external logical volume is connected to said first storage device, and said external logical volume is used as either one or both of said first logical volume and said second logical volume, by mapping the external logical volume to a prescribed storage layer of said first storage device.

13. A storage system comprising: a host device; a first storage device having a first logical volume used by this host device; and a data management device, connected to said host device and first storage device, for managing archive processing relating to data stored in said first logical volume, wherein:
(1) said data management device comprises:
(1-1) an archive management section for managing said archive processing;
(1-2) a volume generation control section for controlling the generation of second logical volumes for said archive processing, in said first storage device; and
(1-3) a switching control section for switching and mounting a plurality of second logical volumes generated by said volume generation control section; and wherein
(1a) said archive management section acquires data to be archived forming the object of said archive processing, from said data stored in said first logical volume, at a prescribed timing,and detects the data size of this data to be archived, wherein the prescribe timing is determined by examining a predetermined retention period of data stored in the first logical volume, and to designate an archive transfer processing of the data when a period remaining for the predetermined retention period becomes less than a predetermined amount;
(1b) said volume generation control section causes said first storage device to generate a second logical volume having a size equal to the data size of said data to be archived as detected by said archive management section;
(1c) said switching control section mounts said second logical volume generated by said volume generation control section;
(1d) said archive management section writes the acquired data to be archived to said mounted second logical volume, and furthermore, establishes an access restriction and an archive retention period for the data to be archived;

(1e) said switching control section unmounts said second logical volume to which said data to be archived has been written by said archive management section; and (1f) said volume generation control section retains information for managing said second logical volume to which said data to be archived has been written; and (2) said first storage device comprises:

(2-1) a control section for performing data communications with said host device, said data management device, said first logical volume and said second logical volume; and (2-3) a memory section used by said control section; wherein (2a) said control section performs data input and output to and from said first logical volume, in response to an access request from the host device;

(2b) said control section generates said second logical volume in accordance with an instruction from said volume generation control section;

(2c) said control section causes said data management device to recognize or cease to recognize said second logical volume, in accordance with an instruction from said switching control section;

(2d) said control section writes said data to be archived input from said archive management section, to said second logical volume, and establishes said access restriction and said archive retention period requested by said archive management section in said second logical volume; and (2e) said control section manages the progress of said established archive retention period in such a manner that the storage contents of said second logical volume are retained during the time period in which the archive retention period is valid.

14. The storage system according to claim 13, wherein, in (1b), if empty space equal to or exceeding the data size of said data to be archived exists in the usable storage region of said first storage device, then said second logical volume having a size equal to the data size of said data to be archived is generated by said first storage device, whereas if empty space equal to or exceeding the data size of said data to be archived does not exist in the usable storage region of said first storage device, then a second logical volume for which the retention term has expired is deleted, from among the second logical volumes that have been generated, and said second logical volume having a size equal to the data size of said data to be archived is generated by means of said first storage device, by using the empty space generated by said deletion.

15. The storage system according to claim 13, comprising a second storage device connected to said first storage device, wherein an external logical volume of said second storage device can be used as said second logical volume, by mapping said external logical volume to a prescribed storage layer of said first storage device.

16. The storage system according to claim 15, wherein a clock section used for managing the progress of the retention period is provided respectively in said first storage device and in said second storage device; and the clock sections of either one of the first and second storage devices is used as a reference clock section, and said archive retention period established for said data to be archived that is stored in the other storage device is corrected on the basis of a signal from this reference clock section.

17. The storage system according to claim 13, wherein said volume generation control section is also able to execute back-up processing for causing the storage contents of said second logical volume to be stored in a third logical volume generated by said first storage device; and an access restriction having the same contents as the access restriction established in said second logical volume is established in said third logical volume.

18. The storage system according to claim 13, comprising a lifespan management section for counting the use time of each of said second logical volumes and outputting a warning signal if the use time thus counted has reached a previously established set time period.

19. The storage system according to claim 13, wherein said host device is able to access said data to be archived in said second logical volume, by means of said data management device.

20. The storage system according to claim 19, wherein archive identification information for identifying the location of said data to be archived relating to an archive process is stored in said first logical volume each time said archive process is carried out; and said host device accesses said data to be archived that is stored in said second logical volume, by issuing said access request containing said archive identification information.

* * * * *